3,614,903
TRANSMISSION APPARATUS
Masaaki Noguchi and Shigeru Sakakibara, Aichi-ken, and Tomoo Ishihara, Tokyo, Japan, assignors to Toyota Jidosha Kogyo Kabushiki Kaisha, Aichi-ken, Japan
Filed Nov. 15, 1968, Ser. No. 776,149
Int. Cl. F16h 47/08, 5/42; B60k 21/08
U.S. Cl. 74—868
41 Claims

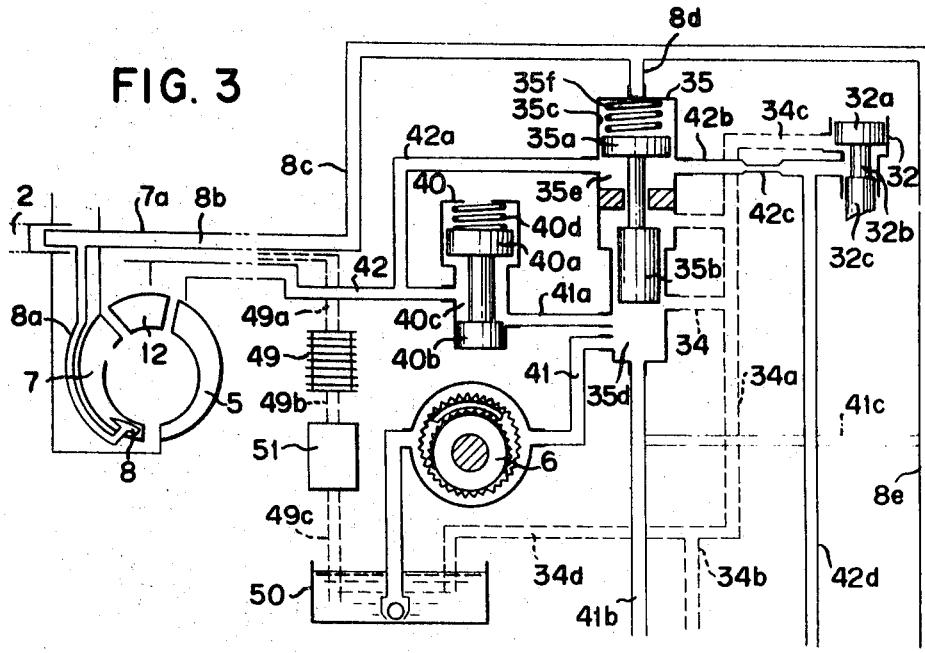
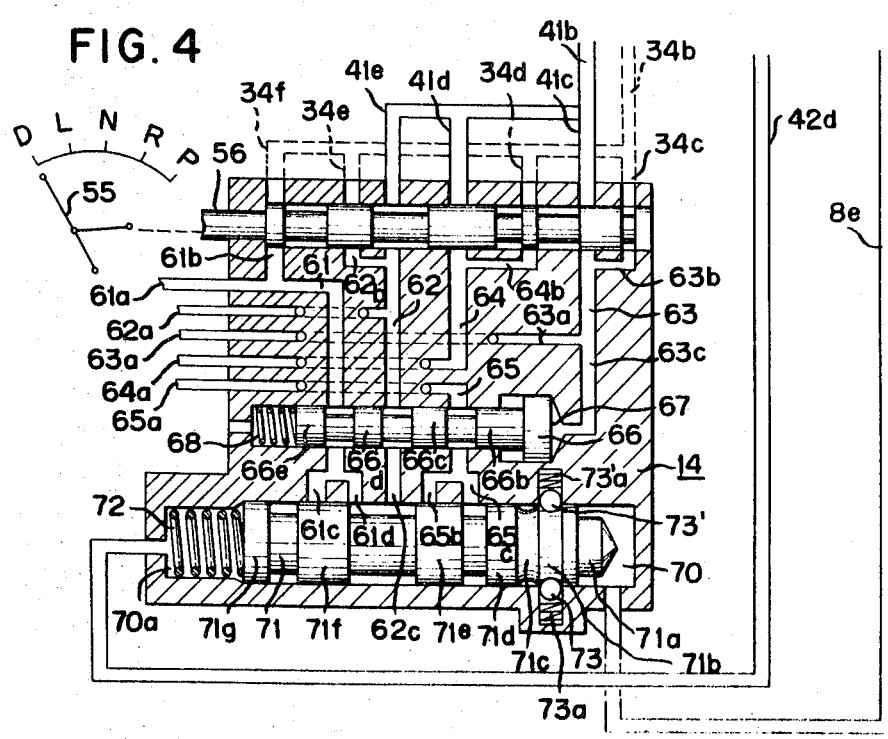

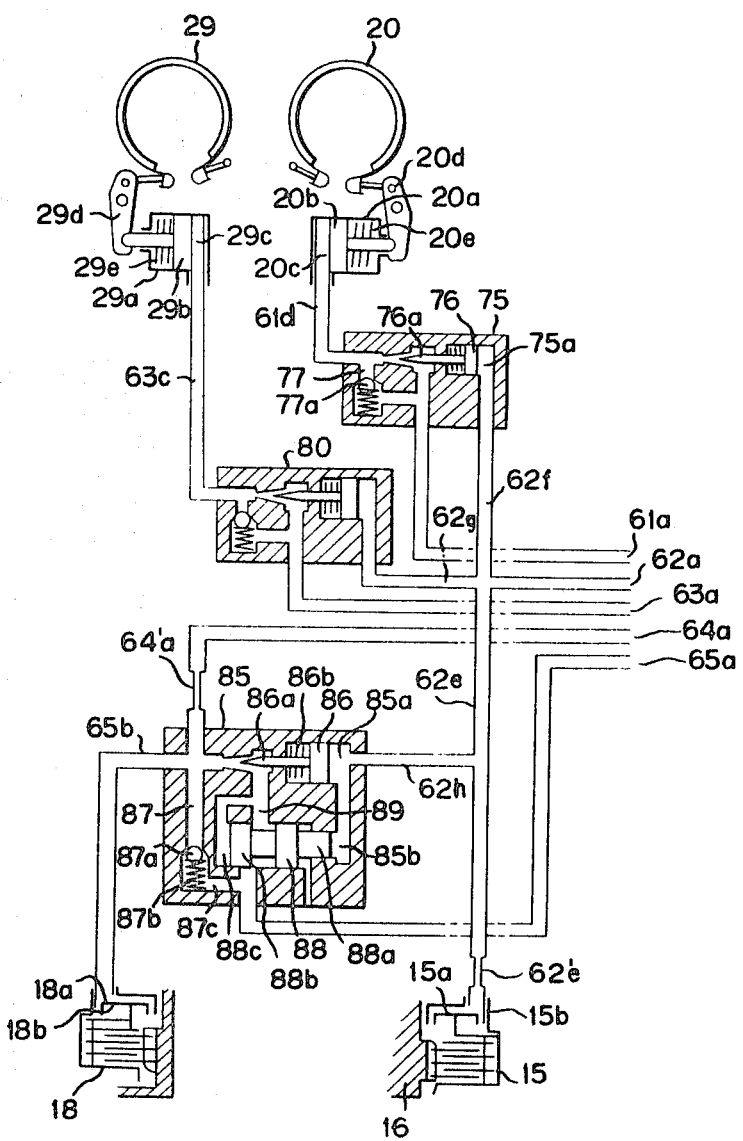

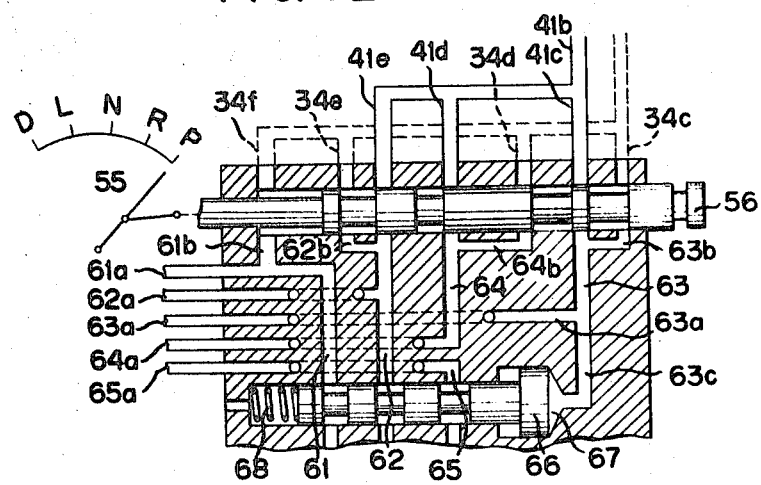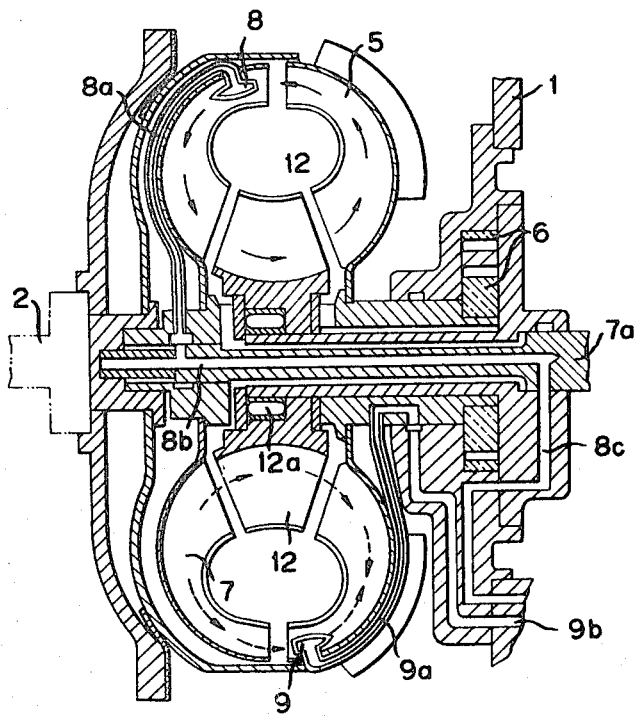

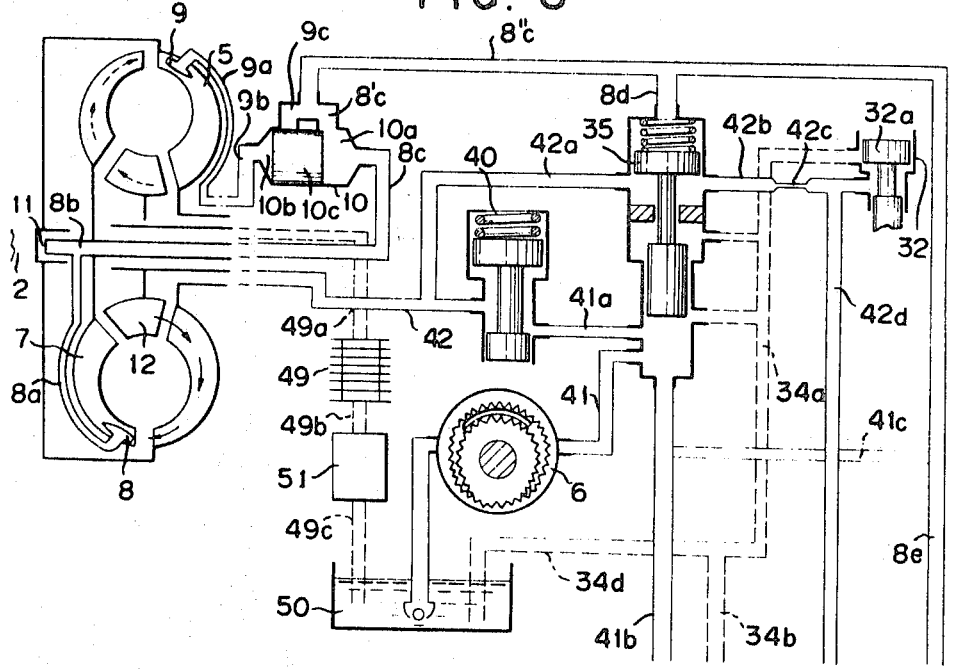
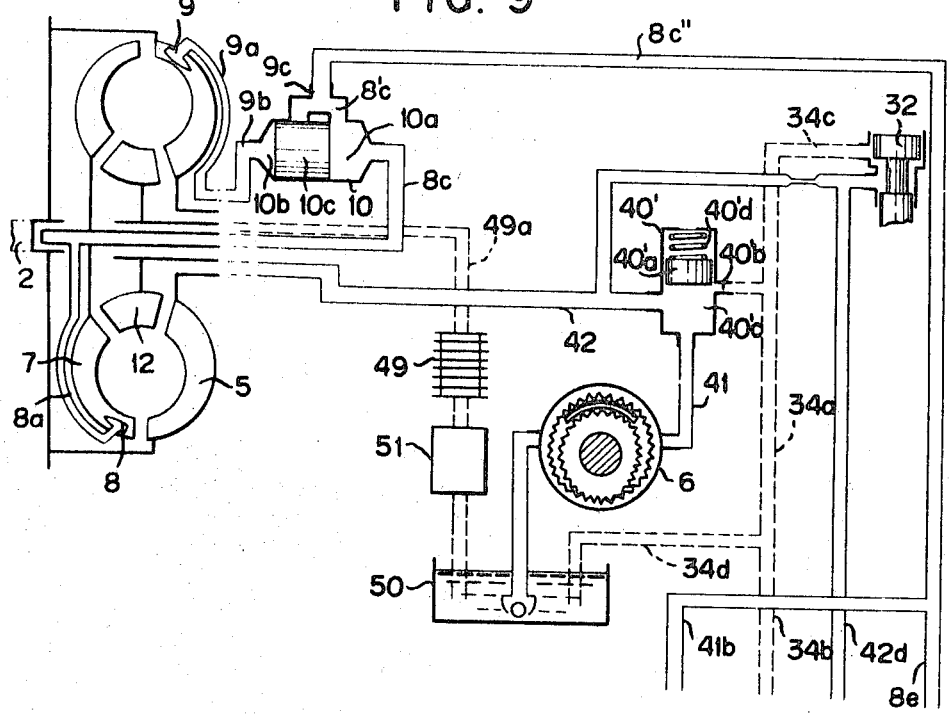

ABSTRACT OF THE DISCLOSURE

This invention relates to transmission apparatus of the fluid variety which includes various speed change gearing. According to the invention, the flow speed of the circulating volume within the torque convertor portion of transmission apparatus is detected and thereafter utilized in the application of pressurized oil to the various portions of the transmission apparatus so that an oil pressure proportional to the flow speed of the circulating volume is obtained. The obtained pressurized oil is then used as the actuating fluid for the respective clutches and brake bands present within the transmission apparatus which act in combination to change the ratios of the speed change gearing and, in addition thereto, detect the shift points at which the automatic changes in the gear ratios are carried out.

---

The present invention relates to transmission apparatus of the fluid variety which includes various speed change gearing and more particularly to transmission apparatus wherein the pressure of oil therein appropriately reflects the flow speed of the circulating volume within the torque convertor portion thereof.

Heretofore, conventional fluid type transmissions generally relied upon in vehicles or other means of transportation have been of the continuous, torque convertor type having speed change gearing therein which comprised, for example, two forward stages and one reverse stage, three forward stages and one reverse stage or four forward stages and one reverse stage, that enabled wider ranges of operation to be obtained. In addition, as it was generally recognized that planetary gears provide a simple and compact mode of changing speed gear ratios, such planetary gearing has been widely adopted to function as the speed change gearing therefor. As there are normally a number of planetary gears included in such speed change gearing, the engagement of the various combinations thereof is usually carried out by selectively engaging or disengaging combinations of one or more brakes and clutches which are actuated by the application of pressurized oil thereto. Furthermore, when it is desired to change the condition of the speed change gearing automatically, it is known to those skilled in the art that the oil pressure applied to said clutches and brakes must be adjusted in accordance with the transmission power and in particular, in accordance with the torque so that a smooth and shock free change in the transmission speed gear ratio may be accomplished.

There are a plurality of systems presently employed in conventional transmission apparatus for adjusting the oil pressure applied to the clutches and/or brakes which are selectively actuated therein to change the condition of the speed change gearing. Such systems include, for example, apparatus wherein the oil pressure is adjusted in relation to the rotation of the wheels, the rotation of the shaft to be driven, the degree to which the accelerator is depressed or similar systems which apply a pressure correction determined by the relationship between the rotation of the engine or the boosting power and the rotation of the driven shaft. In each of these systems, however, the oil pressure as adjusted does not always reflect an oil pressure that is properly proportional to the theoretically required value which is the transmission torque present when the speed gear ratio change is to occur. This deficiency in conventional systems is due principally to the difficulty in ascertaining the proper oil pressure without obtaining the requisite torque value as calculated by dividing the transmission power or the twisting power of the rotary shaft by the number of revolutions of the shaft to be driven. Accordingly, it will be seen, for example, that in such conventional transmission systems considerable errors may be introduced by assuming that the power generated can be measured by the degree to which the accelerator is depressed; and in addition, when the adjustment is obtained in the foregoing manner without dividing by the number of revolutions of the driven shaft, additional errors will be produced. Thus as conventional systems presently in use are incapable of detecting the torque value, the oil pressure cannot be adjusted so as to be proportional thereto.

Therefore, it is the principal object of this invention to provide transmission apparatus wherein the oil pressure supplied to the means for engaging or disengaging various speed change gearing adequately reflects the correct value of the transmission torque.

A further object of this invention is to provide improved transmission apparatus wherein oil pressure which appropriately reflects the correct value of the transmission torque is utilized to detect the shift points at which automatic speed gear ratio change is to occur.

A further object of this invention is to provide improved transmission apparatus wherein the shift point at which automatic speed gear ratio change is to occur is determined by a comparison with a factor which manifests the speed of the engine or the shaft to be driven.

Other objects and advantages of the invention will become clear from the following detailed description of several embodiments thereof, and the novel features will be particularly pointed out in connection with the appended claims.

The above mentioned objects are accomplished in the present invention, in part, due to the realization that the fluid within a torque convertor of a fluid type transmission will form a circulating flow whose flow speed is proportional to the torque then present in the torque convertor. Thus it is possible to accurately determine the transmission torque of the shaft to be driven by detecting the flow speed of the circulating volume within the torque convertor portion of the transmission according to this invention. The flow speed in turn is readily ascertainable from the dynamic pressure present within the torque convertor. Therefore, pressure sensing means may be utilized to detect the pressure present within the torque convertor and the pressure sensed thereby may then be utilized as an indication of the flow speed and; hence, the torque of the driven shaft.

Accordingly, the present invention provides transmission apparatus which includes means for sensing the pressure present within the torque convertor portion of the transmission apparatus wherein a representation of the dynamic pressure within the torque convertor is obtained and may thereafter be utilized so as to insure that the oil pressure within the transmission used to engage and disengage the respective clutches and brakes therein adequately reflects such dynamic pressure. Furthermore, such representations of the dynamic pressure may also be used to detect the upshift and downshift points at which automatic speed gear ratio change is to occur by a comparison of said representation of the dynamic pressure with the factor which reflects the speed of the engine or the driven shaft. Additional objects of the present invention will be apparent from the operation of the embodiments of the instant invention which are disclosed herein and the operation of the disclosed embodiments of the present invention will be clearly understood from the following description and the accompanying drawings in which:

Figure 1:
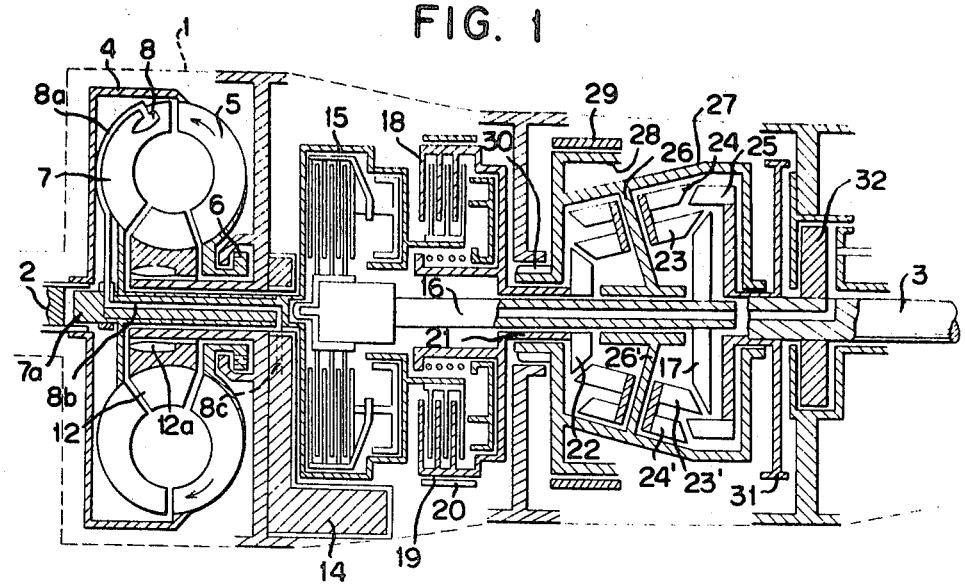
FIG. 1 is a cross-sectional view of fluid type transmission apparatus according to a first embodiment of this invention.
Figure 10:
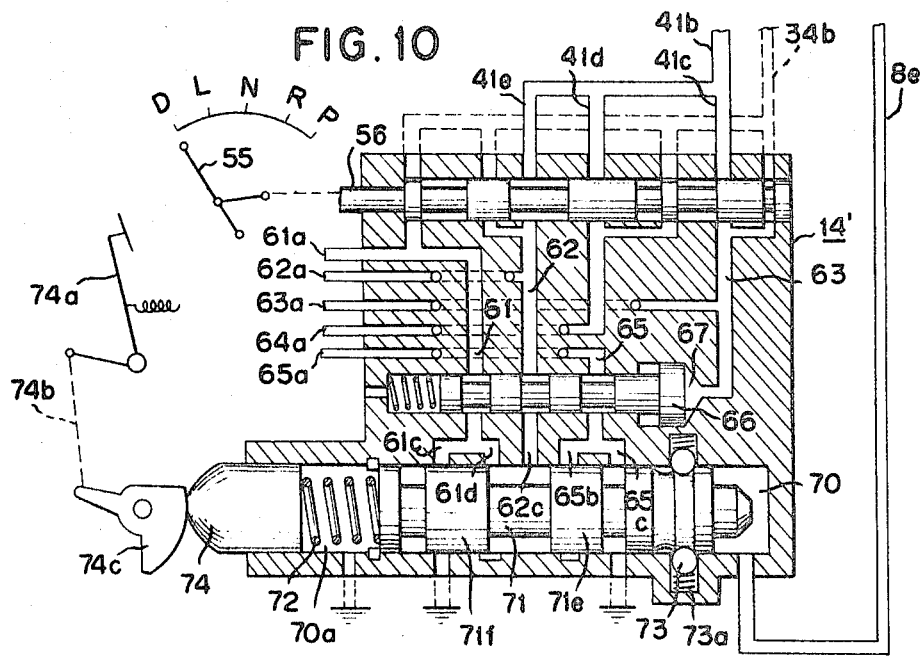
Figure 11:
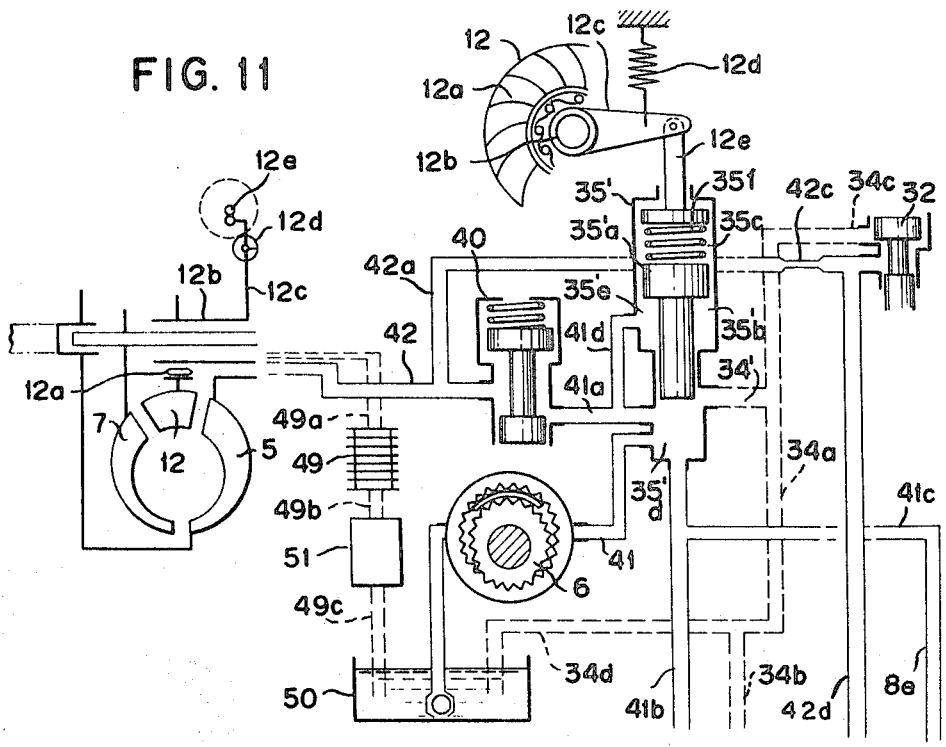

FIGS. 3–5 respectively show various oil pressure circuits of the embodiment of the invention depicted in FIG. 1;

FIGS. 6a–6e depict the various conditions obtainable in the apparatus shown in FIG. 4;

FIG. 7 is a cross-sectional view illustrating another embodiment of this invention;

FIG. 8 is a diagrammatic view further illustrating an embodiment of this invention as shown in FIG. 7;

FIG. 9 is a diagrammatic showing of an additional embodiment of this invention;

FIG. 10 is a diagrammatic showing of a further embodiment of the transmission apparatus according to this invention and;

FIG. 11 illustrates another embodiment of transmission apparatus according to the instant invention.

In the various embodiments of the transmission apparatus according to this invention, which are described herein, transmission apparatus having three forward stages and one reverse stage is generally set forth because such embodiments may be considered typical applications of this invention and further because the selection of such relatively simple transmission structure as exemplary embodiments substantially simplifies the explanatory matter presented herein. However, it should be clearly appreciated at the outset that this invention is of wide application and that the exemplary embodiments described herein are provided only to acquaint those of ordinary skill in the art with the principles involved in the present invention. Accordingly, it will be seen that this invention will find wide application wherever conventional transmission apparatus has been previously utilized.

The transmission apparatus depicted in the FIG. 1 embodiment of this invention comprises a plurality of rotary shafts arranged from left to right along a common axis so that the rotary shafts may be supported by bearings located inside the case 1 which surrounds such shafts. The rotary shaft 2 positioned at the extreme left of FIG. 1 is connected to the rotary shaft of the engine, and is driven thereby to thus constitute the input shaft of the transmission apparatus shown in FIG. 1. The rotary shaft 3 located at the extreme right of FIG. 1 is driven at about the same speed as the input shaft 2 but generally is capable of a reduction in speed as well as rotation in either direction. The rotary shaft 3 is the final or output shaft of the depicted transmission apparatus and in the case of use in an automobile, this shaft would be connected to the drive shaft and through differential gears would apply motive power to the drive wheels. The input shaft 2 is provided with housing 4 which acts to rotate fluid which resides within the torque convertor portion of the depicted transmission. Pump wheel 5 is rotatably mounted on the inner portion of the rotary housing 4 and is adapted for rotation therewith. The pump wheel 5 is provided with a plurality of appropriately shaped, radially extending guide blades or vanes so that the oil within the torque convertor is effectively presented with the centrifugal pumping effect of the rotating bladed pump wheel 5. The central portion of the rotating housing 4 and the pump wheel 5 are formed as a shaft which is supported by bearings located on the external case 1 to thereby achieve and retain the desired stability of rotation. A gear type oil pressure pump 6 is directly connected to the shaft formed thereby to appropriately adjust the generated oil pressure in a manner to be described subsequently and oil having the requisite pressure is supplied to the torque convertor portion of the depicted transmission from the shaft of the pump wheel 5 as well as to the various portions of the transmission. In addition, returning oil is also used to lubricate the various portions of the transmission while oil is supplied through other paths, to be described in conjunction with FIGS. 3–5, to energize the respective clutches and brakes utilized in conjunction with the depicted transmission apparatus. When it is necessary to increase the number of revolutions of the driven shaft, oil is also supplied to a governor valve 32 which is located on the same shaft and is described hereinafter.

A turbine wheel 7 is provided within the rotating housing 4 facing the pump wheel 5 and mounted on a turbine shaft 7a so that the rotation of the bladed turbine wheel 7 is transmitted by said turbine shaft 7a. Dynamic pressure receiving means 8, which may take the form of a pitot tube as shown or any other well known form of pressure sensing device, is positioned between the blades of turbine wheel 7, with the pressure receiving aperture thereof directed toward the pump wheel 5 and having an appropriate angle of attack therewith in the direction of the flow speed. Thus the dynamic pressure receiving means 8 is positioned within the flow path between the blades of the turbine wheel 7 so that the oil received at the root portion of the dynamic pressure sensing means 8 is transmitted along the external wall of the turbine wheel 7, by means of a conduit 8a and is applied to the center of the turbine shaft 7a. The turbine shaft 7a is provided with an axially extending, hollow portion 8b which serves as an oil communicating means so that the oil applied to the center of turbine shaft 7a may be applied to the oil pressure controlling means 14 via the transversely apertured portion 8c of the turbine shaft 7a by utilizing the bearing portion fitted to the external case 1. The oil pressure controlling system and oil paths for applying the pressurized oil to the torque convertor or to the various other portions of the transmission, as described hereinafter, are located in the oil pressure controlling means 14 and include a pressure adjusting valve for receiving and adjusting the pressure of the oil applied from the oil pressure pump 6.

A stator 12 is additionally provided within the rotating housing 4 between the pump wheel 5 of the torque convertor and the turbine wheel 7. The external case 1 extends as a fixed shaft for the stator 12, and is connected thereto by the action of the one way clutch 12a. Therefore, the stator 12 is permitted to rotate along with the external case 1 only in a single direction. The oil in the torque convertor is allowed to return to an external oil reservoir through the bearing portions of the external casing 1. Thus it will be seen that the transmission apparatus depicted in the FIG. 1 embodiment has one of the simplest modes of construction known for transmission apparatus recognized by those of ordinary skill in the art as belonging to the three-factor-one-stage type.

The transmission apparatus depicted in FIG. 1 additionally comprises first and second multi-disc clutches 15 and 18, first and second beveled sun gears 17 and 22 and first and second brake bands 20 and 29. The first multi-disc clutch 15 which is engaged or disengaged by means of oil pressure is fixedly mounted on the turbine shaft 7a of the bladed turbine wheel 7. The rotation of turbine shaft 7a may be selectively applied to the rotary shaft 16 which has the first beveled sun gear 17 mounted thereon when the first multi-disc clutch 15 is engaged. Thus, beveled sun gear 17 can be made to receive the rotation of turbine shaft 7a or may be released therefrom by the selective energization, via the application of pressurized oil, of the first multi-disc clutch 15.

The second multi-disc clutch 18 is also fixedly mounted on the turbine shaft 7a of the bladed turbine wheel 7 and it also acts to selectively transmit the rotation of the turbine shaft 7a. In this case, sleeve 21 having the second sun gear 22 mounted thereon may be made to receive the rotation of the turbine shaft 7a when the multi-disc clutch 18 is energized by the application thereto of pressurized oil. Therefore, it will be seen, that depending upon the state of energization of the multi-disc clutch 18, the beveled sun gear 22 may be selectively engaged or set free.

The first brake band 20 is operably positioned opposite the brake drum 19, borne on the outer periphery of the multi-disc clutch 18 which constitutes an extension of the sleeve 21. The first brake band 20 may be made to selectively engage the brake drum 19 by means of oil pressure applied thereto whereby it is possible to stop the racing of the second beveled sun gear 22 or to allow the free rotation thereof when the multi-disc clutch 18 is disconnected.

The first and second beveled sun gears 17 and 22, respectively, are both located within a rotatably mounted carrier case 27 having first 26 and second 26' shafts fixedly positioned aslant therein. A first beveled planet gear 23 or 23' is mounted on each of the shafts 26 or 26' respectively so that each of said beveled planet gears 23 and 23' engage both of said beveled sun gears 17 and 22. Additionally, a second beveled planet gear 24 or 24' is mounted on each of the shafts 26 or 26', respectively and is positioned to engage a third beveled sun gear 25. The planet gears 24 and 24' are unitarily formed with gears 23 and 23' respectively so that gears 23 and 24 and gears 23' and 24' rotate in unison. The carrier case 27 is adapted at the leftmost portion thereof to engage the rotary sleeve 21 upon which the second beveled sun gear 22 resides and to engage at the rightmost portion thereof, the rotary shaft 3 upon which the third beveled sun gear 25 is mounted. Accordingly, the carrier case 27 enables the first beveled planet gears 23 and 23' and the second beveled planet gears 24 and 24' to rotate about the shafts 26 and 26' mounted aslant and simultaneously therewith revolve with the carrier case 27. An exterior portion of the carrier case 27 is formed as a brake drum 28 having a second brake band 29 positioned in an operative relationship therewith so that the second brake band 29 is energized by oil pressure applied thereto from the external case 1, the rotation of the carrier case 27 is stopped as is the rotation of the first and second planet gears 23 or 23' and 24 or 24'. In addition, a one-way clutch 30 is mounted between the carrier case 27 and the external case 1 at the leftmost portion of the carrier case 27 to thereby allow the carrier case 27 to rotate only in a single direction, which is the same as the direction of rotation of the input shaft 2.

The shaft 3 on which the third beveled sun gear 25 is mounted is the final or output shaft of the transmission depicted in FIG. 1. Accordingly, a parking gear 31 is mounted thereon whose structure and mode of operation may be the same as those commonly in use today so that if the system is stopped, and the hand lever is moved to the park position, a notched body operated by the hand lever is fitted to the gear 31 from the side of the case 1 and the rotation of the shaft 3 is prevented. As is obvious, when the hand lever is in other than the park position, the engagement of the notched body is released and the rotation of the output shaft 3 is not prevented.

A governor valve 32 which is responsive to the centrifugal force generated by the rotation of the output shaft 3 is mounted on the output shaft 3. The governor valve 32, which may comprise any well-known structure, acts in the conventional manner to detect the angular speed of the rotary output shaft 3 and to supply the same as a pressure representation to the oil located therein. The thus obtained oil pressure may be thereafter utilized, as shall be seen hereinafter, to detect the shift points at which automatic gear ratio speed change is to occur and acts as the mechanism to initiate a downshift or an upshift.

The operation of the transmission depicted in FIG. 1 will be explained below, however, to avoid unnecessary, complicated detail, the functions of well-known components or the functions of components whose mode of operation has already been rendered apparent above will be mentioned only briefly in passing.

The torque convertor portion of the transmission illustrated in FIG. 1 is generally composed of only three major portions which include the pump wheel 5 as driven by the input shaft 2, the bladed turbine wheel 7 facing thereagainst, and the stator wheel 12. As such, the torque convertor constitutes one of the simplest structures classifiable as a three factor one stage type. The rotation of the pump wheel 5 acting in conjunction with the bladed turbine wheel 7 continuously changes the delivered torque in accordance with the load torque present at the output side of the torque convertor. Thus if the load is increased, the speed of rotation of the bladed turbine wheel 7 is lowered and torque is thereby increased as the rotation is transmitted by the torque convertor with the torque balanced against the load. In addition to the torque convertor, the transmission depicted in FIG. 1 also includes speed change gearing means which is provided to meet the demands of a larger torque. Therefore in the embodiment shown in FIG. 1, the planetary mechanism composed of the group of beveled gears comprising the first sun gear 17, the second beveled sun gear 22, the first beveled planetary gears 23 and 23', the second beveled planetary gears 24 and 24', the third beveled sun gear 25 and the carrier case 27 containing these gears act as the speed changing means while the first clutch 15 for connecting or disconnecting shaft 16 of the first beveled sun gear 17 to the shaft 7a of the bladed turbine wheel 7, the second clutch 18 for connecting or disconnecting the sleeve 21 of the second beveled sun gear 22 to the shaft 7a, the first brake band 20 for connecting or disconnecting the first brake drum 19 mounted on shaft 21, and the second brake band 29 for connecting or disconnecting the second brake drum 28 on the outer periphery of the carrying case 27 act in combination to select the desired mode of operation of the speed changing means. The various clutch and brake band settings required for the selection of each mode of operation of the speed changing means are set forth in the table below:

TABLE

| | First clutch | Second clutch | First brake | Second brake |
|---|---|---|---|---|
| Forward: | | | | |
| 1st stage | Connected | Disconnected | Released | Connected. |
| 2d stage | do | do | Connected | Released. |
| 3d stage | do | Connected | Released | Do. |
| Reverse | Disconnected | do | do | Connected. |

It should be noted that the specific speed changing gear ratios usable in conjunction with the speed changing means have not been described because such ratios form no part of this invention. However, it should be noted that a wide range of speed changing gear ratios are available with apparatus made in accordance with this invention due to the nature of the planetary mechanisms wherein each of the respective gears may be provided with a widely ranging number of teeth and in addition the range of selection is further increased by the use of the aslant crossing shafts as mounts for the beveled planetary gears.

As previously stated, it is an object of this invention to provide automatic oil pressure adjustment so that an appropriate pressure for connecting the first clutch 15, the second clutch 18, the first brake band 20 and the second brake band 29 is obtained which pressure is determined in accordance with the need. This feature is generally desirable in all transmission apparatus because when the operating oil pressure present therein is not appropriate, the clutches and the brake bands will either engage at once without sufficient slippage or will slip excessively. In the former case, which will occur when the oil pressure is too great, a substantial shock is created at the time of engagement which shock will cause the driving to be unpleasant and result in excessive wear and damage to the transmission. In hte latter case, which occurs when the oil pressure is insufficient, not only will the purpose of the transmission be defeated, but in addition, early wearing of the clutch discs and brake bands will occur. Thus it is seen that either situation should be avoided if possible, however, the object cannot be achieved by merely utilizing a more appropriate throttling valve as it is only through the use of an appropriate oil pressure in combination with the requisite throttling valve that the desired objective can be obtained. The manner in which the instant invention accomplishes this result will become apparent hereinafter as the detailed mode of operation of the FIG. 1 embodiment is described.

Figure 2:
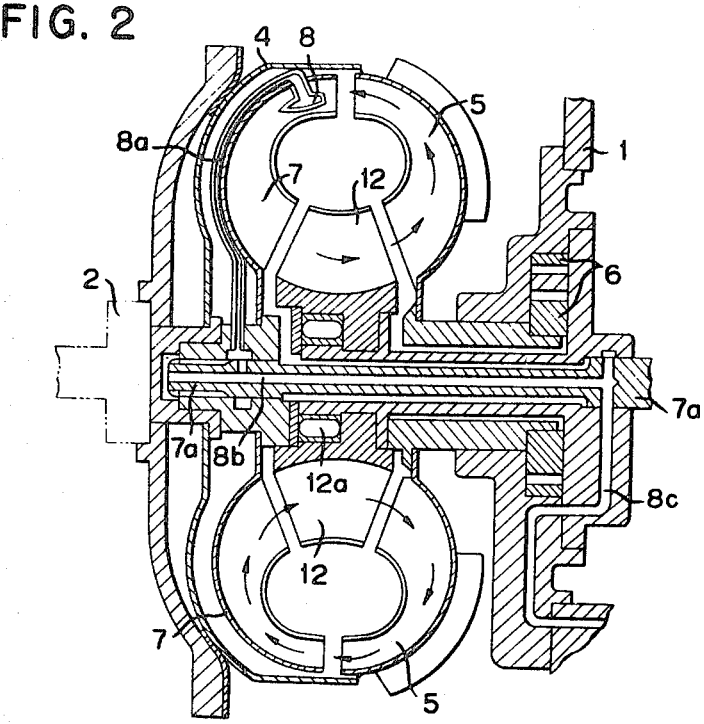
FIG. 2 is a cross-sectional view showing an enlarged portion of the FIG. 1 embodiment.

FIG. 2 shows an enlarged view of the torque convertor portion of the transmission illustrated in FIG. 1. As shown therein, the pressure receiving portion of the pressure receiving means 8 is mounted on a portion of the bladed turbine wheel 7 so that the dynamic pressure of the circulating volume due to the flow of speed thereof may be detected. For the purpose of this explanation, the direction of the circulating mass may be assumed to be indicated by the rotational arrow; however, it should be realized that in actuality the direction of the circulating volume is not within the surface inclusive of the rotary shaft. The receiving portion of the pressure receiving means 8 is mounted so as to have a slight angle of attack whereby the relative speed which corresponds to the difference in the rotational speeds of the pump wheel and the stator may be accurately detected despite the angular orientation of the guide blades thereon. This requisite angle of attack may be determined by making use of the fact that the volume has a tendency to flow along the guide blades and therefore it is a simple matter to select satisfactory angles of attack despite the pressure of a constantly changing relative speed. The oil pressure as detected by the pressure receiving means 8 is used to adjust the oil pressure provided to the transmission system which is described in detail hereinafter with regard to FIG. 3. At this point in the description it need only be noted that the oil pressure detected within the torque convertor at the pressure receiving means 8 comprises the pressure caused by the sum of the internal pressure of the oil, the pressure produced by the centrifugal force of the rotation of the bladed turbine wheel 7 and the dynamic pressure. Further, it should also be appreciated that since the centrifugal force component of the total pressure detected is eliminated upon its arrival at the conduit 8b of the rotary turbine shaft 7a after traversing the conduit pipe 8a, the detected pressure becomes the sum of the dynamic pressure and the internal pressure. This detected pressure is then applied to the oil path 8c provided in the external case 1 portion and thereafter to additional portions of the transmission as indicated in FIGS. 3, 4 and 5.

The portions of the oil path of the FIG. 1 embodiment relied upon to transmit the detected oil pressure to supply and condition responsive oil pressure means are shown in FIG. 3. As shown in this figure, the oil pressure pump 6 which is driven by the rotation of the input shaft 2 supplies oil drawn from the oil reservoir 50 to the main adjusting valve 35 through the oil path 41. The oil pressure which is detected by the pressure receiving means 8 at the bladed turbine wheel 7 within the torque converter is also supplied to the main adjusting valve 35 by the oil path conduit 8c connected to the oil path conduit 8d of the main adjusting valve 35. As this detected pressure comprises the sum of the internal pressure and dynamic pressure, as previously explained, the pressure sum in combination with the pressure exerted by spring 35f is applied to the large diameter piston portion 35a of the piston located within the main adjusting valve 35. Accordingly, it will be seen that a force equal to the area of the large piston portion 35a times the sum of the internal pressure, the dynamic pressure, and the pressure exerted by the bias spring 35f oppose the force generated by the pressure of the pump 6 acting on the small diameter piston portion 35b so that differential forces in opposition control the size of the opening of the return outlet conduit 34 in fluid communication with chamber 35d of the main adjusting valve 35. Thus the pressure within the chamber 35d of the main adjuster valve 35 is controlled so that when the force tending to drive the piston down exceeds the oppositely directed forces acting upon the piston, the pressure within chamber 35d will be increased while when the reverse situation is present the pressure within chamber 35d will be decreased until a balanced condition results. However, as the internal pressure component of the sum of the pressures present in the torque converter should preferably not be reflected in any pressure adjustment for the varying pressure within the torque convertor and further as such internal pressure component is normally a constant, this component may be prevented from exerting any uncompensated force on the piston by the introduction of the internal pressure, in the form to which it is applied to the torque convertor, to the opposite side of the large diameter piston portion 35a of the main adjusting valve 35. This is accomplished in the embodiment of this invention as shown in FIGS. 1 and 3 by branching a secondary oil conduit 42a from the input oil conduit 42, which acts to supply oil from the constant pressure valve 40 to the torque convertor, and connecting the same to chamber 35e whereupon it acts on the underside of the large diameter piston portion 35a. Thus it is seen that the downward forces developed on the piston comprise essentially only components derived from the dynamic pressure developed in the torque convertor and the pressure exerted by the bias spring 35f. In addition, as it has been found that in actuality, the internal pressure of the torque converter is generally less than that introduced in chamber 35e, wherein the former constitutes only stabilized oil pressure, precise compensation can be achieved by allowing therefor in the selection of the size of the connecting rod intermediate the large and small diameter piston portions 35a and 35b. The precompressed pressure obtained by the incorporation of spring 35f, is added because the additional pressure is required theoretically, however it should be noticed that when the flow of speed of the circulating volume is zero (0), or approaches zero (0), its presence is desirable so that sufficient pressure is obtained insuring that the piston will remain properly positioned. The oil pressure appropriately adjusted as aforesaid is thereafter provided to the respective clutches and brake bands of the transmission through the various oil paths which branch from the conduit 41b in a manner which will be fully described in conjunction with FIGS. 4 and 5. In addition, the appropriately pressurized oil is introduced into chamber 40c of the constant pressure adjusting valve 40 via oil path conduit 41a. The oil which has been discharged through the outlet return conduit 34 is returned to the oil reservoir 50 via paths 34a and 34d.

The purpose of the constant pressure valve 40 is to maintain the oil pressure of the oil applied thereto via the conduit 41a constant and thereafter apply such constant pressure oil to the torque convertor portion of the transmission by way of conduit 42. The constant pressure provided by the constant pressure valve 40 is generally less than the minimum oil pressure obtainable from the main adjusting valve 35 and the operation of the constant pressure valve 40 is conventional. Accordingly, the constant pressure valve 40 includes a piston having a large diameter portion 40a and a small diameter portion 40b which portions are interconnected by a connecting rod which forms a first chamber 40c therebetween. A spring 40d is provided to bias the large piston diameter portion 40a and thus maintain a constant pressure thereon. The pressure within the chamber 40c as determined by the pressure of the oil introduced by the conduit 41a acts to oppose the pressure applied by the spring 40d and hence the position of the small diameter piston portion 40b is determined by the difference in pressure therebetween. If the differential pressure results in an overall downward force on the piston, the smaller diameter piston portion 40b will move downward thereby increasing the opening of the input conduit 41a until the aforesaid differential force is balanced. If the differential pressure results in an overall upward force on the piston, the smaller diameter piston portion 40b will move upward thereby decreasing the opening of the input conduit 41a with the chamber 40c until the pressure differential is again equalized. Therefore it will be seen that the oil pressure within chamber 40c is maintained constant and that oil at said constant pressure is applied therefrom to the conduit 42 for application to the torque convertor between the pump wheel 5 and the stator 12 as shown. The reasons for the transmission of oil at a constant pressure are to prevent cavitation due to a rise in the internal pressure within the torque convertor, to circulate said oil through a cooler so that an elevation in the temperature in the internal oil is avoided and also be enable representative samples of such oil to be removed by the pressure receiving means 8. Thus the oil is continuously being supplied to the torque convertor by conduit 42 and continuously removed therefrom at a location between the stator 12 and the shaft of the bladed turbine wheel 7 by the conduit 49a which thereafter returns said oil to reservoir 50 via cooler 49, the portion of the speed change gears which require lubrication, as indicated by block 51, and the conduit 49c.

As previously mentioned, the oil from the constant pressure valve 40 present in conduit 42 is applied to the main adjusting valve 35 by way of branching conduit 42a so as to enter chamber 35e therein. This oil which manifests the internal pressure as set by the constant pressure valve 40 as previously explained is additionally introduced into the governor valve 32 by conduit 42b and conduit 42c which are connected between said governor valve 32 and chamber 35e. The governor valve 32, which may be conventional in structure, is mounted on the output shaft 3 and acts in a well known manner to adjust the pressure of the oil therein to have a pressure proportional to the rotation of the output shaft 3 by utilizing the centrifugal force developed by the shaft 3. This pressure adjustment in the instant case may be obtained by controlling the amount of oil discharged due to the piston portions 32a, 32b, 32c which piston portions will position themselves and hence displace oil by equalizing the differential forces exerted by a bias spring (not shown) and the centrifugal force. The oil pressure proportional to the rotation of the output shaft 3 as derived from the governor valve 32 is applied to the control means 14 (illustrated in FIG. 4) of the automatic speed change mechanism described herein through the oil conduit 42d. Discharged oil is returned to the oil reservoir 50 through the oil conduits 34c and 34d.

FIG. 4 depicts the portion of the transmission illustrated in FIG. 1 which is utilized to control the gear type speed changing means both manually and automatically. As will be shown in conjunction with the discussion pertaining to FIG. 4 and the additional figures relating thereto, when the hand actuated control lever 55 is placed at various positions designated D, L, N, R and P, pressure supplied from the main adjusting valve 35 through the oil conduit 41b is selectively branched or divided within control means 14 to supply oil to the respective clutches and brakes or to reservoir return paths located within said control means 14. In the controlling means 14 as shown in FIG. 4, shaft 56 is provided in an interlocking relationship with the hand actuated control lever 55 and is thus displaced along with said hand actuated control lever 55 so that the drive range of the transmission can be selected. In addition, an automatically switching shaft 71 is provided for automatically changing the available oil paths and hence the gear ratio so that the difference between the dynamic pressure received by the pressure receiving means 8 and the pressure of the governor valve 32 may be utilized to ascertain the various shift points. Finally, a shaft 66 for connecting the oil paths formed to the automatically switching shaft 71 when the hand actuated control lever 55 is at the D position, and for disconnecting the oil paths when the hand actuated control lever 55 is at other positions is provided so that the "drive range" is the only selectable range in which an upshift or a downshift may occur. The operation of the control means shown in FIG. 4 is explained in conjunction with FIGS. 6a–6e which show in detail the various oil pressure circuits established when a given driving range is selected by the manipulation of the hand actuated control level 55.

(1) LEVER 55 IN THE D POSITION (AUTOMATIC GEAR RATIO CHANGE)

Figure 6A:
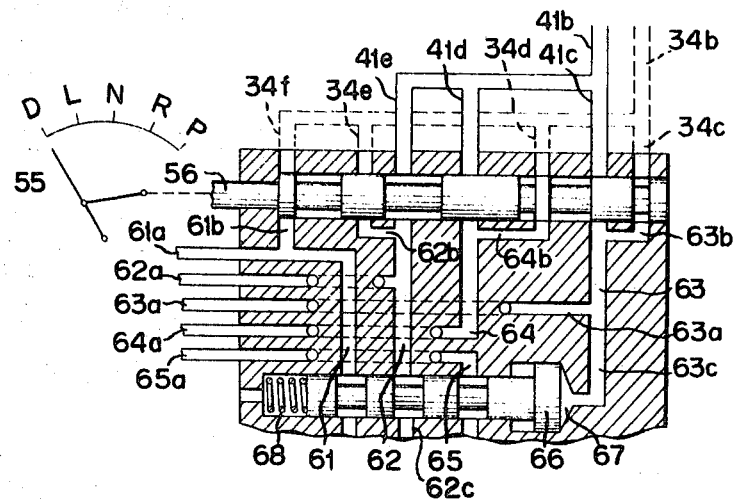

If the hand actuated control lever 55 of the speed control means shown in FIG. 4 is placed in the D position the oil pressure circuits, as shown in FIG. 6a will be established and the gear ratios between the second and third forward speeds will be automatically changed. As shown in FIG. 6a, when the hand actuated control lever 55 is in the D position, the shaft 56 interlocked therewith established a path of oil flow from the main adjusting valve 35 via conduit 41b, which branches into three separate condiuts 41c–41e, through branch conduit 41e to the oil circuit 62. This path is established because, as may be seen from FIG. 6a, none of the sleeve portions present on shaft 56 seal branch conduit 41e while the remainder of the branch circuits 41c and 41d are foreclosed by the various sleeve members mounted on shaft 56. Thus, in this case, oil present in branch circuit 41e will flow around shaft 56 and to the oil circuit 62. The oil circuit 62 is further divided into three paths which include conduits 62a through 62c respectively. However, as oil path 62b is foreclosed by a sleeve member mounted on shaft 56, the oil applied to path 62 is prevented from flowing to the return path 34e and thereafter to the reservoir 50 via return conduits 34b and 34d. Thus, the oil applied to path 62 divides between oil conduit 62a and 62c as clearly shown in FIG. 6a. The oil applied to conduit 62a is applied to the first clutch 15 shown in FIG. 1 and more particularly in FIG. 5 and will be used to energize the same in a manner to be explained subsequently.

The shaft 66 is correctly positioned to allow oil present in path 62 to pass thereabout into conduit 62c as the bias spring 68 present thereagainst at the left most portion thereof is able to position shaft 66 at its extreme right position because chamber 67, located at the right most end of shaft 66, is void of oil because conduit 41c is foreclosed by a sleeve portion of shaft 56 while an oil return path 34c is connected thereto via oil paths 63b, 63c and a shaft portion of shaft 56. In addition, the shaft 66 in the position illustrated in FIG. 6a not only connects the oil path 62 to 62c, but also, as shown in FIG. 4, connects the oil path 61 to 61c and 61d and the oil path 65 to 65b and 65c, respectively.

The oil pressure present inconduit 62c is applied to the center portion of the automatic switching shaft 71 as shown in FIG. 4 whereby it may, in this case, be applied to either oil conduit 61d or oil conduit 65b depending upon the position of the center shaft portion of shaft 71. The shaft 71 has a first chamber 70 located at the extreme right end thereof which chamber is in fluid communication with pressurized oil as supplied to conduit 8e by the pressure receiving means 8 which is representative of the internal and dynamic pressures of the circulating volume then present in the torque convertor. A second chamber 70a is located at the extreme left portion of shaft 71 and said second chamber 70a is in fluid communication with an oil pressure proportional to the flow speed as produced by the governor valve 32 and applied thereto via conduit 42d. In addition, a bias spring 72 is provided within the chamber 70a to establish a precompressed force which is larger than the internal pressure of the torque convertor. Therefore, it will be seen that a differential force corresponding to the difference between the pressure due to the vehicle speed and the dynamic pressure of the torque convertor is continuously acting upon the shaft 71 to thereby determine the position thereof and hence whether conduit 61d or conduit 65b is to be in fluid communication with conduit 62c.

When a vehicle, for example, is running normally the pressure within the chamber 72 becomes sufficiently great to displace the shaft 71 to the right whereby conduit 65b is placed in fluid communication with conduit 62c, however, if an abrupt acceleration is produced, the vehicle should climb a slope, or the dynamic pressure within the torque converter should otherwise substantially increase; the pressure within the chamber 70 establishes a force which will overcome that applied by the chamber 70a and the shaft 71 will be displaced to the left. When this condition obtains, the case illustrated in FIG. 4 will be present wherein conduit 61d is connected to conduit 62c while conduit 65b is foreclosed by the sleeve 71e mounted on shaft 71. Thereafter, as the dynamic pressure is reduced shaft 71 will return to the right position whereby the gear ratio is shifted from second to third. The movement of the shaft 71 in either direction is accomplished in a stepwise manner because the springs 73a and 73'a act upon the locking balls 73 and 73' respectively, to rapidly engage the grooved shaft portions 71b and 71c thereby achieving a positive displacement of shaft 71 which will rapidly occur. Thus, as soon as the pressure within the chamber 70 or 70a becomes sufficiently large so that the engagement between the locking balls 73 and 73' and the groove 71b or 71c is broken, the urging of the spring biased locking balls 73 or 73' will aid the differential force to quickly establish the automatic step-up or step-down in the gear ratio. It should be noticed that when shaft 71 is in one of its two positions whereby one of the conduits 61d or 65b is connected to the pressurized oil present in conduit 62c, not only is the other conduit 65b or 61d foreclosed from conduit 62c by sleeve portion 71e or 71f but in addition thereto, the connected oil circuit 61 to 65 is foreclosed from its discharge path connected to conduit 61c or 65c by sleeve portion 71f or 71e respectively, and the disconnected oil circuit 61 or 65 is connected to its respective oil discharge branch connected to conduit 61c or 65c. Thus, when the shaft 71 is in the left most position, the situation illustrated in FIG. 4, it will be seen that oil circuit 61 is in fluid communication with conduit 62c as conduit 61d is connected thereto by a portion of shaft 71 lacking a sleeve, while conduit 61c and hence oil circuit 61 is foreclosed from its oil discharge path (not shown) because conduit 61c is foreclosed by sleeve portion 71f. In contradistinction thereto, the oil circuit 65 is disconnected from the oil pressure present in conduit 62c because the conduit 65b is foreclosed by the sleeve 71e mounted on that shaft 71, and the oil circuit 65 is connected to its discharge path (not shown) because the conduit 65c is connected thereto by a portion of shaft 71 without a sleeve portion mounted thereon. As can readily be seen by an inspection of FIG. 4, when the shaft 71 is in the right most position, the converse of the above described relationship obtains.

When the shaft 71 is in the left most position, the position illustrated in FIG. 4, the oil pressure from the oil conduit 61d is applied to conduit 61a through oil path 61. Thereafter, as may be seen in FIG. 5, the oil pressure present in conduit 61a is applied to the first brake band 20 to energize the same whereby the brake band 20 will engage the brake drum 19 on the shaft of the second beveled sun gear 22 shown in FIG. 1 to thus establish a first condition for the second speed gear ratio. In addition, as the large diameter sleeve portion 71e of the shaft 71 has foreclosed oil conduit 65b and opened oil conduit 65c to thereby connect oil circuit 65 to its discharge path, the oil pressure within oil circuit 65 is reduced to zero. When the oil pressure within oil circuit 65 is reduced to zero, the second clutch 18 as shown in FIG. 5 is disengaged so that the second condition for the second speed gear ratio is also present. Furthermore as oil pressure has not been applied to either oil circuit 63 or 64 and in addition as each of these circuits is connected, due to the position of shaft 56, to its oil return paths at 34b, by the connection of conduit 63b to 34c and 64b to 34d respectively, the brake band 29 connected to oil circuit 63 and the clutch 18 connected to oil circuit 64 will remain in the deenergized condition thereby further satisfying the conditions for second speed gear ratio operation wherein the brake drum 28 is allowed to rotate. Finally, as the oil circuit 62 was initally energized by the positioning of the hand actuated gear lever 55 in the D position, oil pressure will be applied to oil conduit 62a and hence, to the first clutch 15, to thereby energize the same. Thus, it will be seen that when shaft 71 is in the leftmost position, all the necessary conditions for second speed gear ratio operation, as set out in the chart above, are met and the vehicle will operate in this specified gear ratio.

When the dynamic oil pressure as sensed by the pressure receiving means 8 is decreased, the pressure present in chamber 70 located at the extreme right end of the shaft 71 will decrease accordingly. If at this time, the oil pressure indicative of the vehicle's speed as provided to chamber 72 on the left side of the shaft 71 increases, the shaft 71 will displace to its right most position in the manner described above. Under these conditions the oil circuit 61 will be disconnected from the oil circuit 62 as previously mentioned, since the oil conduit 61d will be foreclosed by the large diameter sleeve portion 71f mounted on a shaft 71. In addition, oil conduit 61c will be connected via the presence of only a small shaft portion of shaft 71, to its discharge path and hence the oil pressure within oil circuit 61 will be reduced to zero. Such a reduction to zero of the oil pressure present in oil circuit 61 and hence conduit 61a will deenergize the brake band 20 and therefore the brake band 20 will no longer engage the brake 19 as shown in FIG. 1. Thus, the deenergization of brake band 20 will establish the first condition for the third speed gear ratio as specified in the chart above. With the shaft 71 in its right most position, as previously mentioned oil conduit 65b will be connected via the shaft portion of shaft 71 to oil conduit 62c thereby pressurizing oil circuit 65. In addition, the connection of oil circuit 65 to its discharge path via oil conduit 65c is foreclosed by the sleeve portion 71e mounted on the shaft 71. When the oil circuit 65 is thus pressurized, oil pressure will be applied to oil conduit 65a and hence to the second clutch 18, as shown in FIG. 5, to energize same and to thereby cause it to engage. Accordingly, it will be seen that a second condition for the third speed gear ratio as set out in the chart above will be met by the energization of oil circuit 65 and furthermore, as none of the other conditions with regard to oil circuits 62, 63 or 64 have been changed from these mentioned previously, all the conditions for the third speed gear ratio have been met. Therefore, it will be seen that when the hand actuated gear lever 55 is in the D position, the second speed gear ratio and the third speed gear ratio will be automatically changed depending upon the position of shaft 71.

(2) LEVER 55 IN THE L POSITION (FORWARD IN FIRST SPEED ONLY)

Figure 6B:
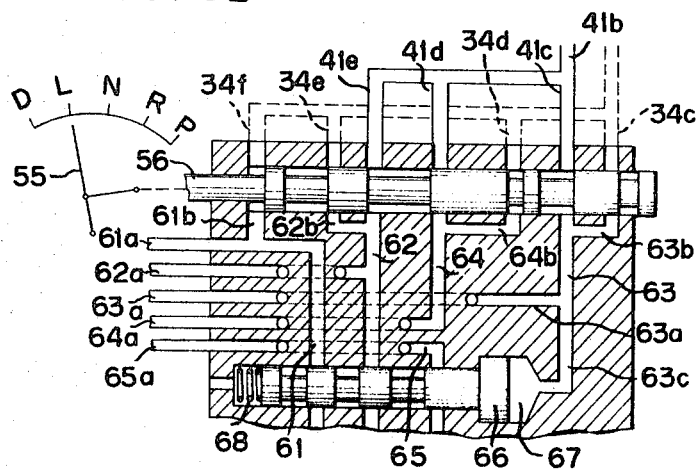

If the hand actuated control lever 55 of the speed control means shown in FIG. 4 is placed in the L position the oil pressure circuits as shown in FIG. 6b will be established and the gear ratio of the transmission will remain in the first forward gear ratio. As shown in FIG. 6b when the hand actuated control lever 55 is in the L position, the shaft 56 interlocked thereto establishes a path of oil flow from the main adjusting valve 35 via conduit 41b which branches as aforesaid to the three paths 41c through 41e, through branch circuits 41c and 41e to the oil circuits 63 and 62 respectively. These paths are established because, as may be seen in FIG. 6b, none of the sleeve portions present on shaft 56 seal branch conduits 41c or 41e but the branch 41d is foreclosed by a large diameter sleeve portion thereof. In addition, oil circiuts 61 and 64 are connected by the location of shaft 56 to their return oil paths at 34b by the selective connection of conduit 61b via a shaft portion of 56 to conduit 34f and the connection of conduit 64b via a shaft portion of 56 to conduit 34d. Therefore, it will be seen that oil circuits 61 and 64 are maintained by the selection of the L position at zero oil pressure due to their respective connections to the reservoir via return oil circuit 34. The oil circuits 62 and 63 are, however, foreclosed from connection to the oil return path 34b because the large diameter sleeve portions of shaft 56 foreclose the connection of conduit 62b to conduit 34e and the connection of conduit 63b to conduit 34c. Thus oil circuits 62 and 63 are connected to the pressurized line 41b via their respective branching conduits 41e and 41c and are foreclosed from the connection to the return path 34b. When the oil circuit 63 is connected to pressurized line 41b via the small shaft portion of 56 and branching circuit 41c, pressurized oil is applied to conduit 63a which acts as may be seen in FIG. 5 to energize brake band 29 and thereby cause the same to engage brake drum 28. This selective engagement of the second brake establishes as may be seen by inspection of the chart presented above a first condition for first speed gear ratio operation. In addition, the pressurized oil applied by conduit 41c to oil circuit 63 is connected via conduit 63c to the chamber 67 of the shaft 66. The application of the pressurized oil to chamber 67 of shaft 66 will overcome the bias of spring 68 applied to the opposite end of shaft 66 and accordingly, cause the shaft to displace to its extreme left position as shown in FIG. 6b. When the shaft 66 is in its extreme left position as shown in FIG. 6b, all of the oil circuits 61, 62, and 65 which might connect through the shaft 66 to shaft 71, as shown in FIG. 4, are foreclosed by large diameter sleeve portions mounted on shaft 66. Thus, any oil pressure which may be present in oil circuit 62 cannot be transmitted to conduit 62c and hence any oil pressure which would otherwise be present in conduit 62c is foreclosed from oil circuits 61 and 65 and hence from oil conduits 61a and 65a. Thus, regardless of the position of shaft 71, no automatic shifting of gear ratios is present when the hand actuated gear lever 55 is in the L position and accordingly lines 61a and 65 remain in a zero pressurized condition.

Oil pressure present in conduit 41b is additionally connected as aforesaid via conduit 41e and the small shaft portion of shaft 56 to oil circuit 62. As conduit 62b is foreclosed from its return path 34e and 34b by a large diameter sleeve portion of shaft 56 and is additionally foreclosed from connection to the center chamber of shaft 71, all of the oil pressure present therein is channeled to conduit 62a to thereby pressurize first clutch 15 via the connection of said pressurized oil through conduits 62e and constriction 62'e as shown in FIG. 5. Thus, it will be seen that the first clutch 15 is engaged by the oil pressure present in oil circuit 62 and hence a second condition for first speed gear ratio operation obtains. In addition, as oil circuits 61, 64, and 65 are in an unpressurized condition, neither the second clutch 18 nor the first brake band 20 are engaged whereby the remaining conditions for first speed gear ratio operation have been met. Therefore it will be seen that when the hand actuated control lever 55 is in position L, the conditions required for first speed gear ratio operation obtain and such conditions are maintained so long as the hand actuated control lever remains in this position regardless of the position of the automatic speed changing shaft 71.

(3) LEVER 55 IN THE N POSITION

Figure 6C:
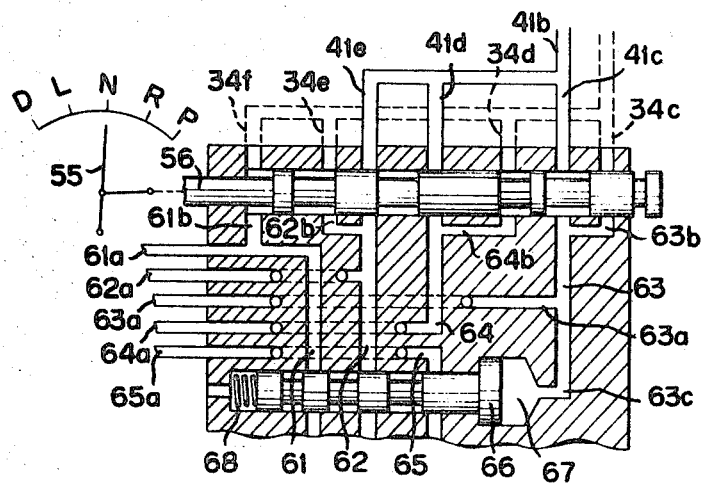

If the hand actuated control lever 55 of the speed control means 14 shown in FIG. 4 is placed in the N position the oil pressure circuits shown in FIG. 6c will be established and no forward or reverse gearing will be engaged. The conditions for satisfying a neutral position may be satisfied by disconnecting the first clutch 15 and the second clutch 18 from the pressurized oil line and hence whether or not the first brake band 20 and the second brake band 29 are in the engaged or disengaged condition does not matter. In the neutral condition for the embodiment of this invention depicted in FIG. 1, as shown specifically in FIG. 6c, the first and second clutches 15 and 18 respectively, will be disengaged and the first brake band 20 will be disengaged while the second brake band 29 will be engaged; however, it should be noted that in other embodiments of this invention various other convenient combinations of the states of engagement of the brake bands 20 and 29 may be used. As shown in FIG. 6c, with the hand actuated control lever 55 in the N position, the shaft 56 interlocked therewith will establish a path of oil flow from valve 35 via conduit 41b, which branches as previously described into three paths 41c through 41e, through branch conduit 41c to the oil circuit 63. This path is established because as may be seen from inspection of FIG. 6c, the large diameter sleeve portions mounted on shaft 56 foreclose each of the paths 41e and 41d so that oil circuits 62 and 64 cannot be energized by the pressurized oil present in conduit 41b. In addition, only oil circuit 63 is foreclosed by a large diameter sleeve portion mounted on shaft 56 from connection to its return conduit 63b with the return path related thereto comprising conduits 34c and 34b. Each of the other oil circuits i.e., 61, 62 and 64 are connected by small shaft portions of shaft 56 to the return conduit 34b by the respective connection of their respective return conduits 61b, 62b, and 64b to the return conduit branching portions 34f, 34e, and 34d respectively. Thus it will be seen that as oil circiuts 62 and 64 are disconnected from the pressurized line 41b by the large diameter sleeve portions of the shaft 56, the first and second clutches 15 and 18, connected respectively, to conduits 62a and 64a will be deenergized as they are connected to conduits having essentially zero oil pressure therein. The oil conduit 41b is as previously mentioned connected to oil circuit 63 and thus conduit 63a is energized and hence will cause the second brake band 29 to engage its respective brake drum thereby causing the second brake to be engaged. In addition, the pressurized oil present in oil circuit 63 will be transmitted to chamber 67 located at the extreme right end of shaft 66 by condut 63c to thereby overcome in a manner mentioned above the bias exerted by spring 68 to thereby displace shaft 66 to its extreme left position. As previously explained with regard to FIG. 6b, when shaft 66 is in its left position circuits 61, 62, and 65 will be foreclosed by the large sleeve portion mounted thereon from connection with the various oil connections which may be established by the shaft 71 in its automatic switching of oil from conduits 61d and 65b. Thus, for the reasons previously explained conduits 61a and 65a, in addition to conduit 62a will not have pressurized oil flowing therein and hence the first brake band 20, the first clutch 15, and the second clutch 18 will be retained in a disengaged position thereby fully satisfying the previously set forth conditions required or the N position or the neutral mode of operation.

(4) LEVER 55 IN THE R POSITION (Reverse)

Figure 6D:
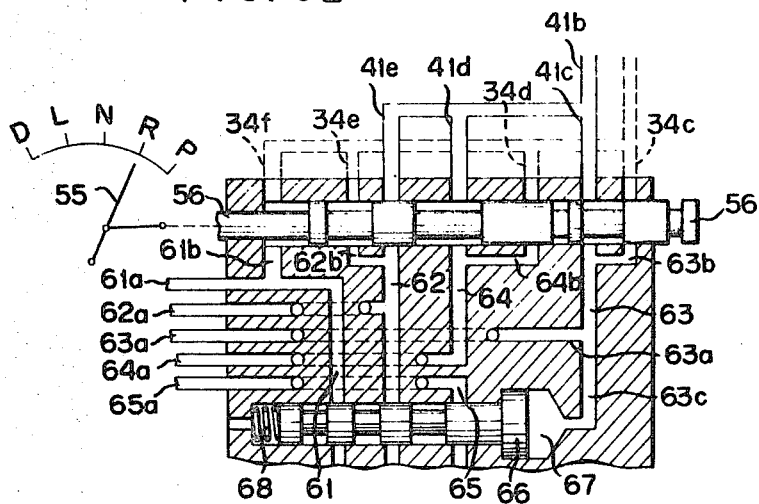

When the hand actuated control lever 55 of the speed control means shown in FIG. 4 is placed in the R position, the oil circiuts as shown in FIG. 6d will be established. As is shown in FIG. 6d, the shaft 56 interlocked to the hand actuated control lever 55 will establish a path of oil flow from main adjusting valve 35 via conduit 41b to branching conduits 41c and 41d which in turn are connected by small shaft portions of the shaft 56 to the oil circuits 63 and 64 respectively. In addition, the oil circuits 63 and 64 are foreclosed from connection to the return path 34b because their respective return conduits 63b and 64b are blocked from connection with the return path connecting conduits 34c and 34d, respectively, by the large sleeve portions mounted on the shaft 56. Furthermore, oil circuits 61 and 62 are connected to the oil return path 34b via their respective connections by the small shaft portions of shaft 56 to return path branching condiuts 34f and 34e. Thus, it will be seen that oil circuits 61 and 62 are maintained at essentially a zero oil pressure condition due to their connection to the oil reservoir 50 via the oil return path established by 34b in combination with its respective connected return branching conduits 34f and 34e. The oil pressure applied to oil conduit 41c and hence to the oil circuit 63 is connected to the oil conduit 63a to thereby energize, as may be seen in FIG. 5, the second brake band 29 which will engage brake drum 28 whereby a first requirement of the reverse speed gear ratio as set forth above is satisfied. Additionally, the oil present in oil circuit 63 will, in the manner previously explained with regard to the conditions depicted in FIGS. 6c and 6b, traverse oil conduit 63c to thereby displace shaft 66 to its left most position. Such displacement of shaft 66 to its left position will, in a manner described above, prevent any interconnections which may be established by shaft 71 between oil circuits 62 and 61 respectively. Accordingly, in the instant case, the conduits 61a, 62a, and 65a are maintained at essentially a zero oil pressure condition whereby, as may be seen in FIG. 5, the brake band 20 and the first clutch 15 will be disengaged. Futrher, although conduit 65a is maitained at essentially zero oil pressure, the oil circuit 64 connected by the small shaft portion of shaft 56 to branching conduit 41d, will cause conduit 64a to be pressurized and thereby act to engage the second clutch 18.

Thus it will be seen that when the hand actuated lever 55 is placed in the R position, the first clutch 15 and the first brake band 18 will be disengaged while the second clutch 18 and the second brake band 29 will be engaged. This relationship, clearly satisfied the conditions required for the reverse speed gear ratio set forth in the chart above and accordingly, such operation will thereby be initiated.

(5) LEVER 55 IN THE P POSITION

In so far as the transmission according to this invention is concerned, there are many systems wherein the connection between the input shaft and the output shaft may be disabled while at the same time a parking gear on the output shaft is mechanically interlocked and a notched or fitted body is inserted thereinto so that the parking gear is clamped in a manner required by the P position. In the embodiment disclosed with regard to FIG. 1, the manner in which the parking gear 31 is externally clamped has been previously described and hence will not be reiterated here. Thus, only the oil circuits established or disc connected when the hand actauted lever 55 is in the P position will be described. As shown in FIG. 6e, when the hand actuated control lever 55 is in the P position, the shaft 56 interlocked thereto will foreclose each and every oil pressure branching conduit 41c through 41e so that oil pressure from the main adjusting valve 35 cannot be coupled via conduit 41b to any oil circuit present in the transmission. Accordingly, an inspection of FIG. 6e will make it obvious that each of the oil branching conduits 41c through 41e is foreclosed by a large diameter sleeve portion of the shaft 56. In addition, each of the internal oil circuits 61 through 64 which connect to the various clutches and brake bands depicted in FIG. 5 are connected to the oil return path 34b via the respective connections by the small shaft portions of shaft 56 of their return oil conduits 61b through 64b to the respective branching portions of the oil return paths 34c–34f. Thus, the oil pressure which resides in each of the oil circuits 61 through 64 is reduced essentially to zero and hence the first clutch 15, the second clutch 18, the first brake band 20 and the second brake band 29 are all placed in the deenergized condition. Therefore it will be seen that the conditions required for the part condition have been satisfied.

The foregoing discussion pertaining to the various modes of operation of the control means depicted in FIG. 4 has generally stated that one or more of the oil conduits 61a through 65a receive pressurized oil and that the respective clutches and brake bands as shown in FIG. 5 connected thereto are selectively energized or deenergized. The precise mode of operation of the various clutches and brake bands shown in FIG. 5 as well as the apparatus used therewith is presented below with regard to a discussion of FIG. 5.

As shown in FIG. 5, pressurized oil present in oil conduit 61a is applied to energize the brake band 20 by the application of such pressurized oil to a throttle valve 75 which is in fluid communication with the brake cylinder chamber 20c via oil conduit 61d. The oil conduit 61a is supplied with pressurized oil applied thereto, as explained in conjunction with FIG. 4, whenever the hand actuated control lever 55 is in the D position and the shaft 71 is in the left most position as when the vehicle is initially starting out or when a down shift occurs. However, as is the case with regard to the clutches 15 and 18 or the brake band 29, if the brake band 20 initially engages the brake drum 19 under substantial pressure, a substantial reaction torque is generated which will introduce a substantial initial shock to the depicted transmission. Therefore, it will be seen that the pressure under which the brake band 20 is initially brought into engagement with the brake drum 19 should vary in magnitude so that sufficient slippage will occur to avoid the introduction of a severe shock into the transmission. Further, as the torque or reaction torque will vary depending upon the rotational speed of brake drum 19, the reduction in oil pressure should be variable therewith. In the case of brake band 20, the oil pressure to be reduced will be that applied by the oil conduit 61a and the magnitude of the reduction achieved should be appropriate to avoid the presence of a substantial engaging shock by allowing sufficient slippage to occur. Thus, if the torque of brake drum 19 is great, substantial slippage should be allowed, whereas, when the torque is less substantial a lesser amount of slippage should be allowed so that optimum results are obtained over a wide range.

In the embodiment of this invention as shown in FIG. 5, the reduction in the oil pressure applied by oil conduit 61a to brake band 20 is accomplished by the utilization of the throttle valve 75. As may be seen by the inspection thereof the throttle valve 75 comprises a needle valve 76 and a bypass oil path therefor indicated at 77. The needle valve 76 acts through its valving portion 76a, in the well known manner, to constrict the size of the path through which oil introduced by conduit 61a may flow and hence reduce the flow thereof. The piston portion of the needle valve 76 communicates with chamber 75a of the throttle valve which is operably connected as shown to oil communicating conduit 62f. The oil communicating conduit 62f is directly connected to the oil conduit 62a which serves to energize the clutch 15, which clutch 15 is normally in the energized condition whenever the transmission disclosed herein is in one of its forward speed gear ratios. Thus, the amount of resistance introduced into the oil circuit 61 will depend upon the amount of pressure present in oil conduit 62a which thereby serves as an indication of the speed of the rotating brake drum 19. Therefore it will be seen that the initial oil pressure introduced by conduit 61a is reduced in magnitude as initially applied to cylinder 20c so that initial slipping of the brake band 20 is allowed; however, as such initial reduction of pressure is only necessary for a period of time which depends on the magnitude of the torque of the brake drum when this torque is reduced as the vehicle reduces its acceleration, the pressure in conduit 62a and hence 62f will be reduced as explained above whereby a greater proportion of the pressurized oil applied by oil conduit 61a will be transmitted to the brake cylinder 20c. Thus it will be apparent that although an initial reduction in the oil pressure present in conduit 61a is provided so as to allow the smooth engagement of brake band 20 with brake drum 19 shortly thereafter, the amount of the pressure present in conduit 61a will be applied to the brake cylinder 20c so that slipping over an excessive period of time is avoided.

The bypass path 77 and the spring biased check ball 77a therein are provided for the rapid removal of pressurized oil from the brake band 20. Thus, in the well known manner, when the pressure in conduit 61a is removed, the pressure present in conduit 61d will quickly overcome the bias of the check ball 77a whereby the oil present in the brake cylinder 20c may quickly drain through line 61a via the by pass path 77.

As was the case with regard to brake band 20, it is often necessary to adjust the force with which the brake band 29 is engaged, accordingly, a throttling valve 80 is interposed between the connection of the brake cylinder 29c thereof and the oil conduit 63a which supplies oil thereto. The necessity for this adjustment may be appreciated when it is realized that the hand actuated control lever 55 is often quickly switched from position D in which the second brake band 29 is released to position L wherein the second brake band 29 is engaged. Since the throttling valve 80 is of the same construction as throttling valve 75, whose operation has been previously explained, the operation of the throttling valve 80 will not be reiterated here; however, it should be mentioned that the operation of the brake band 29 when energized by pressurized oil presented by oil conduit 63a is the same as that described above with regard to the operation of brake band 20.

As first clutch 15 is in an engaged condition for all forward positions which may be set by the selection of either position L or position D, the first clutch 15 will rarely cause engagement between members having substantial torque. Accordingly, oil pressure presented by oil conduit 62a to the first clutch 15 need not be applied through sophisticated throttling device. Therefore, the oil pressure applied by oil conduit 62a is connected directly to the multidisc first clutch 15 via minor constriction 62'e which supplies sufficient throttling. As the internal structure of the first clutch 15 and its operation is conventional in all ways, a detailed discussion thereof is not thought to be necessary.

The manner in which the second clutch 18 is engaged is more complex than that previously described with regard to the first clutch 15 because said second clutch 18 is engaged in both the R position of the hand actuated control lever 55 as well as the D position and therefore substantially different engagement torques as well as other considerations are present in each case. If the hand actuated control lever 55 is set in position R, it will be seen that one of two possible conditions may accompany the engagement of the second clutch 18. In the first condition, the second clutch 18 is engaged when the position of the hand actuated control lever is shifted when the car is initially started from position N to position R. Under this condition, the rotation of the engine is slow and hence a very low torque is present when the second clutch 18 is initially engaged. Therefore, as low torque is present no substantial problems are encountered with regard to initial starting shock and hence the pressurized oil applied to line 64a may be applied directly to the second clutch 18 via line 65b as shown in FIG. 5. In the second possible condition, the hand actuated control lever 55 is placed in the R position while the engine is racing, for instance, after the engine is revved in the neutral position or if it is quickly shifted from the D position so that rocking may be accomplished. However, under normal circumstances, the engagement torque under such second conditions will not be exceedingly high and therefore pressurized oil present in line 65a may again be directly applied to the second clutch 18 via conduit 65b as the throttling constriction 64'a present in oil conduit 64a is sufficient to reduce the initial oil pressure so that substantial shocks will not be produced when the second clutch 18 is initially engaged.

When the hand actuated control lever 55 is in the D position and the speed of rotation of the transmission shafts are sufficient to cause the gear ratio to automatically shift from the second speed to the third speed, it will be seen, from the chart above, that the first brake band 20 is released and the second clutch 18 is engaged. Under these conditions the second clutch 18 will engage with the brake drum 19 which has substantial torque and hence during the interval of initial engagement substantial slippage should be allowed. Further, as the second clutch 18 should preferably share the torque with the first clutch 15 in accordance with the ratio established by the planet gears, the oil pressure with which the second clutch 18 engages should be modified so that the load is shared between the first and second clutches 15 and 18 respectively in proportion to said predetermined ratio. Accordingly, as said sharing ratio can be less than two to five, and further since the clutching area normally utilized by the second clutch 18 in this position is the same as that utilized in the R position, the oil pressure applied to engage said second clutch 18 should be reduced so that it is substantially lower than the oil pressure applied to the first clutch 15. Thus, when the transmission, in the D position, automatically shifts from the second speed gear ratio to the third speed gear ratio, the first brake band 20 is reelased and pressurized oil is supplied to the second clutch 18 via oil conduit 65a. When this occurs the oil present in the cylinder of the first brake band 20 will be quickly released as it will traverse the oil path in which the bypass 77 is present in the manner previously explained, and the oil pressure is applied to the second clutch 18 via the oil conduit 65a. The oil pressure applied to the second clutch 18 is appropriately throttled by needle valve 86 in a manner which is substantially the same as was described with regard to needle valve 76 utilized in conjunction with the brake band 20. In this case, a chamber 85a which is in fluid communication with the piston portion of the needle valve 86 will receive oil pressure supplied by oil conduits 62h, 62e, and 62a in a manner similar to that previously explained with regard to needle valve 76 and, as oil conduit 62a is generally pressurized at all of the forward speeds of the transmission, appropriate oil pressure will be applied to chamber 85a to thereby reduce the initial pressure of the initially applied oil to the clutch 18. In addition, as the oil pressure supplied by conduit 65a must also be reduced in proportion to the previously specified sharing ratio which exists between the second clutch 18 and the first clutch 15, a second chamber 85b is provided in fluid communication with the first chamber 85a to thereby receive the pressurized oil supplied by conduits 62h, 62e and 62a. The pressurized oil present in chamber 85b acts against the shaft 88a in a manner to displace said shaft 88a to the left such that when no opposing force is present, the fluid communicating chamber formed between the large diameter sleeve portions 88b and 88 which reside on shaft 88a will allow oil present in conduit 65a to be directly communicated to conduit 89 without any substantial reduction in pressure. However, once oil pressure is communicated to conduit 89, this pressure will also manifest itself within chamber 88c to thereby oppose the force provided by the oil in chamber 85b and hence displace the shaft 88a toward the right. As the area of the large diameter sleeve portion 88b, which is in fluid communication with the chamber 88c, has been selected so that the product of the stabilized pressure in the chamber 88c and this area will yield a force which will sufficiently oppose the force generated by the pressure on the other side of the large diameter piston portion 88b plus the force applied to the right end shaft portion 88a by the pressurized oil in chamber 85b; the fluid communicating member which resides between sleeves 88b and 88 will be positioned at an appropriate location so that the pressure present in conduit 65a is reduced in proportion to the desired ratio after initial conditions have settled. Accordingly the oil pressure applied to conduit 89 and hence the second clutch 18 will be substantially lower than that applied to the first clutch 15 such that even after the resistance introduced by needle valve 86 is reduced whereupon the second clutch 18 will be fully engaged, the oil pressure applied thereto by the oil conduit 65a to actuate and hence engage the second clutch 18 is appropriately reduced in pressure in accordance with the ratio previously determined by the relationship of the planetary gears.

Finally, it should be noted that the pressure reducing valve 85 is additionally supplied with a check ball valve 87a such that pressurized oil may be rapidly drained from the second clutch 18 when the second clutch is disengaged. As the check ball valve 87a operates in the same manner and achieves the same results as the check ball valves previously described with regard to the brake band oil circuits of brake bands 20 and 29, the further discussion thereof is not considered necessary.

Thus, it will be seen that the mode of engaging the respective clutches 15 and 18 and the brake bands 20 and 29, illustrated in FIG. 5 allows the transmission apparatus of this invention as embodied in FIG. 1 to act in a positive manner without the introduction of substantial shocks thereto.

Accordingly, it will be seen that a first embodiment of the automatically switching transmission apparatus in accordance with this invention has been provided wherein the speed of the circulating volume within the torque convertor is detected and utilized to adjust the pressure of the oil supplied throughout the transmission as well as to determine the precise points at which automatic speed change is to occur.

The second embodiment of the automatically switching transmission apparatus according to the present invention is shown in FIGS. 7 and 8. In the second embodiment of this invention, commonly utilized apparatus which was previously described with regard to the FIG. 1 embodiment have received the same reference numerals used in the FIG. 1 embodiment so that such commonly used apparatus may be easily identified and need not be described again with regard to FIGS. 7 and 8. In addition, as the embodiment of this invention shown in FIG. 7 is a modification of the initial embodiment disclosed in FIG. 1, only pertinent portions of the transmission apparatus as necessary for the proper disclosure of this embodiment have been shown; however, it will be realized that in an actual embodiment the additional portions of the transmission as referred to in the description of this embodiment are also incorporated therein.

The second embodiment of the present invention as shown in FIGS. 7 and 8 will find application where it is desired that the transmission enhance the retarding force normally applied by an engine when the accelerator is released and/or where it is desired that the transmission automatically downshift whenever the pump gear 5 ceases to be the driving element. The torque convertor section of the transmission apparatus of this embodiment of the invention as shown in FIG. 7, includes each element of the torque convertor portion of the transmission apparatus of the FIG. 1 embodiment and in addition thereto a second pressure receiving means 9, which may again take the form of a pitot tube, is mounted on the pump wheel 5 in a manner to detect pressure introduced to the shaft of the pump wheel by the bladed turbine wheel 7. A conduit 9a is provided in fluid communication with the pressure receiving means 9 so that, in the manner previously described in regard to conduit 8a, the pressure detected by the pressure receiving means 9, may be connected to a second oil conduit 9b present within the external case 1 whereby pressure representative of that within the torque convertor as sensed by the pressure receiving means may be removed from the case 1. As is apparent, the pressure receiving means 9 is directed toward the bladed turbine wheel 7 and hence the flow speed of the circulating volume detected thereby will be that occasioned by the turbine wheel 7 when the turbine wheel 7 is acting as the driving element rather than the driven element. The pressure receiving means 8 mounted on turbine wheel 7, as shown in FIG. 7, is directed toward the pump wheel 5 in a manner to receive and detect the pressure induced by the flow speed of the circulating volume as driven by the pump wheel 5. Thus it will be seen that the two pressure receiving means 8 and 9 are oppositely directed such that the former will detect the flow speed of a circulating volume when such circulating volume is driven by the pump wheel 5 acting as the driving element while the latter will detect the flow speed of a circulating volume when driven by the turbine wheel 7 acting as the driving element to cause the rotation of the pump wheel 5. As is obvious, the former condition will obtain when the engine is driving the input shaft which may be considered to be the normal operating condition.

The latter case will be present whenever the engine braking effect is produced, as when the accelerator is released and the car is coasting by inertia. Further, this latter condition is especially prevalent when the automobile is abruptly braked or the vehicle traverses a downward incline where it is allowed to coast. When such second condition is present, the turbine wheel 7 and the pump wheel 5 are reversed in their normal roles whereas the bladed turbine wheel 7 acts as the driving element and the pump wheel 5 is driven thereby to generate the so called braking effect. In the instant embodiment of the transmission apparatus according to this invention, the torque generated by the turbine blade when the engine is braking is utilized in conjunction with the torque normally generated by the pump wheel 5, so that when the second condition is present the transmission according to this embodiment will downshift and thereby enhance the braking effect of the engine and also place the transmission in a condition such that rapid acceleration may be achieved when the accelerator is again depressed.

As may be seen in FIG. 8, the representative pressures detected by the pressure receiving means 8 and 9 are brought out of the torque convertor section of the portion of the transmission apparatus depicted therein by conduits 8b and 8c and 9b and 9c respectively, and representative pressures thus detected are applied to a switching valve 10 which is connected to the oil conduit 8″c. Oil conduct 8″c connects to the remainder of the transmission apparatus according to this embodiment of the invention in the manner shown in FIG. 8. As the transmission apparatus connected after the switching valve 10 is virtually identical to the transmission apparatus described in conjunction with the FIG. 1 embodiment of this invention and more particularly to the portions thereof shown in FIGS. 3–5, such apparatus will not be further described here. The switching valve 10 comprises first and second chambers 10a and 10b respectively and a switching sleeve 10c mounted therein which is adapted to displace either to the right or left due to the differential pressures which may be applied to the chambers 10a and 10b. As the conduit 8c is connected to chamber 10a, the pressure detected by the pressure receiving means 8, when the turbine wheel 7 is being driven by the pump wheel 5, is normally applied to chamber 10a. In a similar manner, as conduit 9b is connected to chamber 10b, the pressure detected by the pressure receiving means 9 when the turbine wheel 7 is driving the pump wheel 5 is normally applied to chamber 10b. Thus, the pressure applied to each of the chambers 10a and 10b will act differentially to position differential sleeve 10c in a manner which will be described hereinafter and displace the same by the difference in the pressures applied to said chambers 10a and 10b.

When a vehicle, for instance, is in its normal operating condition, wherein the input shaft 2 is being driven by the engine, the pump wheel 5 acts as the driving element and the bladed turbine wheel 7 constitutes the driven element. Under these conditions, the pressure receiving means 9 will sense only the internal pressure and the pressure derived from the centrifugal force developed within the torque convertor as no dynamic pressure will be generated at the pressure receiving means 9 when the pump wheel 5 acts to drive the turbine wheel 7. As the pressure due to the centrifugal force is substantially attenuated, in the manner described with regard to the FIG. 1 embodiment, essentially only the detected internal pressure is applied to the chamber 10b via conduits 9a and 9b under these conditions. In contradistinction thereto the pressure detected by the pressure receiving means 8 under the normal operating conditions of the vehicle consists of the dynamic pressure, the internal pressure, and the pressure due to the centrifugal force and, hence, the pressure applied to chamber 10a by oil conduits 8b and 8c will be representative of both the dynamic pressure and the internal pressure developed within the torque convertor section of the transmission apparatus according to the present invention. Thus, when the vehicle is operating in its normal mode of operation, the pressure present in chamber 10a will overcome the pressure present in the left chamber 10b whereby the shifting sleeve 10c will be displaced to the left and thereby cut off the flow of pressurized fluid from chamber 10b via conduit 9c to conduit 8"c. However, the pressure present in chamber 10a, which is representative of both the internal pressure and the dynamic pressure within the torque convertor under these conditions, is applied to the oil conduit 8"c via conduit 8'c. Therefore it will be seen that under these conditions, the portion of the transmission apparatus according to this embodiment of the invention as depicted in FIG. 8 will operate in the same mode as that described with regard to FIGS. 1 and 3 of the FIG. 1 embodiment, of this invention. Accordingly, the internal and dynamic pressure within the torque convertor is applied from conduit 8"c to the main adjusting valve 35 via conduit 8d and to the control portion 14 of the transmission, as shown in FIG. 4, through the oil conduit 8e. Thereafter the operation of the transmission will be the same as described with regard to FIGS. 4, 5 and 6a through 6e.

When, however, the accelerator is released and the engine acts as a brake, the turbine wheel 7 thereby becomes the driving element and the pump wheel 5 becomes the driven element. Under these conditions, the dynamic pressure of the circulating volume is detected by the pressure receiving means 9 while only the internal pressure and the pressure due to the centrifugal force within the torque convertor is detected by the pressure receiving means 8. Accordingly, as the pressure received by chamber 10b is now representative of both the dynamic pressure and the internal pressure while the pressure received at chamber 10a represents only the internal pressure present within the torque convertor, the switching sleeve 10c will be displaced towards the right and hence only pressurized fluid from chamber 10b will be transmitted to conduit 8"c via conduit 9c as the connection between chamber 10a and conduit 8'c is blocked by the differential switching sleeve 10c. Under these conditions, the pressure as sensed by the pressure receiving means 9 will be applied to the main adjusting valve 35 and in addition to the oil conducting conduit 8e to thereby operate and supply properly pressurized oil to the remainder of the transmission in a manner described with regard to the FIG. 1 embodiment as depicted in FIGS. 4 and 5. However, as the transmission, just prior to an engine braking condition, would be normally expected to be in the D position wherein the third forward gear ratio is present and the pressure within chamber 70 is relatively low; the sudden presence of the substantial pressures sensed by the presure receiving means 9 and applied thereto by conduit 8e will cause the shaft 71 (shown in FIG. 4) to displace to the left whereby the transmission will downshift from the third speed gear ratio to the second speed gear ratio and markedly increase the braking effect of the engine.

Therefore, it will be seen that the embodiment of the transmission apparatus depicted in FIGS. 7 and 8 discloses a modification of the embodiment shown in FIG. 1 wherein a marked increase in the braking effect of the engine is achieved due to the automatic downshifting of said transmission whenever a substantial reverse dynamc pressure is developed within the torque convertor section thereof.

A further embodiment of this invention is shown in FIG. 9 wherein the embodiment of FIGS. 7 and 8 has been modified so that the main adjusting valve 35 as shown in FIG. 8 is no longer present and the constant pressure adjusting means 40 has been modified to directly receive the oil from oil pump means 6 and appropriately adjust the pressure thereof. As the embodiment shown in FIG. 9 is highly similar to that illustrated in FIG. 8, common elements in both embodiments have retained previously utilized designations and the mode of operation of such common elements, where substantially unchanged, will not be further described.

In the embodiment of this invention shown in FIG. 9, the oil pressure supplied by the oil pressure pump means 6 is applied to chamber 40'c of the constant pressure adjusting means 40' by oil conduit 41. The constant pressure adjusting means 40' includes piston means 40'a, a bias spring 40'd and an outlet oil conduit 40'b. The outlet oil conduit 40'b is connected via conduits 34a and 34d to the oil reservoir 50 and thereby acts as a pressure release valve for the constant pressure valve means 40'. The bias spring 40'd acts against the piston means 40'a to maintain the pressure within the chamber 40'c of the constant pressure adjusting means 40' at a specified constant level which is determined by the magnitude of the force exerted by the bias spring 40'd. If this predetermined pressure is exceeded within the chamber 40'c, by the oil supplied thereto by the oil pump 6, the excessive force exerted on the opposite face of piston means 40'a will displace said piston means 40'a in the upward direction whereby oil will be discharged through the outlet conduit 40'b to thereby reduce the pressure within said chamber 40'c. However, when the pressure within the chamber 40'c as supplied by the oil pumping means 6 drops below the predetermined level as set by the bias spring 40'd, said bias spring 40'd will displace piston means 40'a in a downward direction to thereby cut off outlet conduit 40'b from the chamber 40'c to thus increase the pressure thereof. Accordingly, constant pressure is maintained within the chamber 40'c and the pressurized oil is applied therefrom to the torque convertor via the oil condiut 42 as described in conjunction with the FIG. 1 embodiment. The constant pressure oil supplied to the torque convertor via conduit 42, provides the internal pressure therefor and this internal pressure is provided to the governor valve 32 via branching oil conduit 42a in the manner described with regard to the FIG. 1 embodiment. The constant pressure oil supplied to the torque convertor is additionally returned therefrom to the reservoir 50 via return conduit 49a, cooler 49 and the portions of the transmission 51 which require lubrication.

In operation, when the vehicle, for instance, is operating in the normal condition, the oil pressure detected by the pressure receiving means 8 as mounted on the bladed turbine wheel 7, as explained in conjunction with FIGS. 2 and 7, is applied to the oil conduit 8c and represents the sum of the dynamic pressure and the internal pressure of the circulating volume. However, when the vehicle is coasting or the accelerator is otherwise released so that the engine is operating in a braking mode wherein the turbine wheel 7 is driving the pump wheel 5, the dynamic pressure present in the torque convertor as well as the internal pressure therein is detected by pressure receiving means 9 in the manner described with regard to FIG. 7 and is applied to oil conduit 9b thereof. The pressures detected by the pressure receiving means 8 and 9 are supplied to chambers 10a and 10b respectively of the differential switching valve 10 in the manner described above with regard to FIG. 8 and the pressure of chamber 10a or 10b, which ever is greater, is applied to conduit 8″c via connecting conduit 9c or 8′c. The conduit 8″c to which the greater of the dynamic and internal pressures within the torque convertor are applied, transmits the pressurized oil flow therein to oil conduits 41b and 8e which are directly connected thereto. The conduits 41b and 8e connect to the transmission controlling means 14 which was previously described with regard to FIG. 4 and is identical thereto both in structure and in operation. Thus, it will be seen that pressure representative of the sum of the dynamic and internal pressures of the flow speed of the circulating volume within the torque convertor is applied directly to the controlling means 14 and to the various oil circuits located therein. However, since the dynamic pressure of the circulating flow, as detected by the pressure receiving means 8 and 9, and applied directly to the controlilng means 14, is strictly proportional to the transmitted torque, such pressure is used directly in these embodiments of the invention to energize the respective clutches and brake bands of the transmission apparatus in accordance with the oil circuits activated by the controlling means 14 of FIG. 4. In addition, it will be noted that the oil pressure applied to oil path 8e will allow the automatic switching shaft 71 as shown in FIG. 4 to detect the proper point for downshift and upshift to occur and accordingly automatic speed change is accomplished as in the preceding embodiments.

FIG. 10 depicts an alternative embodiment of speed controlling means for use in accordance with the transmission apparatus according to the present invention. As the apparatus shown in FIG. 10 includes a substantial amount of structure which is common to FIG. 4, like structure in each case bears the same reference numerals. It will be recalled that when the hand actuated control lever 55 of the speed controlling means 14 depicted in FIG. 4 was placed in the D position, whether or not the transmission was in second or third forward speed gear ratio was dependent upon the position of the automatic shifting shaft 71 which controlled the application of pressurized oil from oil circuit 62 to either oil circuits 61 or 65. The position of the automatic switching shaft 71 in turn was dependent upon the differential pressure between chambers 70 and 70a located at either end thereof. The pressure present in chamber 70, it will be recalled, was representative of the dynamic and internal pressures sensed within the torque convertor section of the transmission and applied to chamber 70 by oil conduit 8e while the pressure in the chamber 70a was dependent on both the pressure due to the spring bias means 72 and the pressure generated by the rotational speed of the wheels as measured by the governor valve 32 and applied to chamber 70a by conduit 42d. Accordingly, when the pressure present in chamber 70 exceeded the pressure present in 70a, the automatic shifting shaft 71 was displaced to its left most position and oil pressure present in oil circuit 62 was applied to the first clutch means 15 via oil conduit 61a to thereby place the transmission apparatus in the second forward speed gear ratio. However, when the pressure in chamber 70a exceeded that present in chamber 70, the automatic switching shaft 71 was displaced to its right most position whereby oil circuit 62 was disconnected from oil circuit 61 and connected to oil circuit 65 via the central portion of automatic switching shaft 71 intermediate the large diameter sleeve portions 71f and 71e mounted thereon. Thus under these conditions, the transmission according to this invention was in its third forward speed gear ratio whereby oil pressure was applied to the first clutch 15 via conduit 62a and to the second clutch 18 via conduit 65a.

In the FIG. 10 embodiment of speed control means 14′ adapted for use in conjunction with transmission apparatus according to the instant invention the mode of applying pressure to chamber 70a has been modified such that the pressure applied thereto is determined by the position of the accelerator pedal within the vehicle. Accordingly, it will be seen that all of the structure depicted in FIG. 10 is like that already shown and described with regard to FIG. 4 except that the means for applying pressure to chamber 70a has been substantially modified. Thus, it will be seen that the means for applying pressure to chamber 70a now includes in addition to the spring 72, piston 74, cam means 74c adapted to displace the piston 74 and various pivoted connecting rods 74a and 74b which interconnect the cam 74c with the accelerator pedal.

In operation, the embodiment of the speed controlling means 14′ as illustrated in FIG. 10 is similar to the speed controlling means 14 as shown in FIG. 4 except that the mode in which the automatic switching shaft 71 is displaced differs therein. Accordingly, when the hand actuated control lever 55 is in the D position such that the shaft 56 interlocked thereto applies pressurized oil from conduit 41b to only oil circuit 62 via branching conduit 41e, pressurized oil is applied to the first clutch 15 via conduit 62a and in addition to the center portion of the automatic switching shaft 71 which resides between large diameter sleeve portions 71f and 71e. Whether the oil present in conduit 62c is applied to oil ciricuit 61 or 65 again depends upon the position of the automatic switching shaft 71 which is determined by the differential pressures which reside between the chambers 70 and 70a located at either end thereof. Thus if the pressure present in chamber 70 exceeds the pressure present in chamber 70a, the automatic switching shaft 71 will be displaced toward its left position wherein oil present in conduit 62c is applied to oil ciricuit 61 and such oil is applied to the first brake band 20 via conduit 61a to thereby place said automatic transmission in its second forward gear ratio speed. Alternatively, if the pressure present in chamber 70a exceeds that present in chamber 70, as previously described with regard to FIG. 4, the automatic switching shaft is displaced to its right most position and oil present in conduit 62c is applied to oil circuit 65 and hence to the second clutch 18 via conduit 65a while oil circuit 61a is disconnected. As the structure of the automatic switching shaft 71 is identical to that described with regard to FIG. 4, it will be realized that the shift from the second speed gear ratio to the third speed gear ratio or the converse thereof will occur in the rapid and positive manner described with regard to FIG. 4. However, although the pressure applied to chamber 70 is applied in the same manner as was described by FIG. 4, the pressure present within chamber 70a is determined by the position of the piston means 74 which determines the compression of the spring means 72. The position of the piston means in turn is controlled by the cam 74c which is connected via connecting rods 74a and 74b to the accelerator pedal in a manner such that as the accelerator pedal is increasingly depressed, the cam 74 will displace piston 74 increasingly to the right thereby increasing the pressure within chamber 70a. Thus, it will be seen that the position of the automatic switching shaft 71 and hence the point at which upshift or downshift is detected is determined in this embodiment by the differential pressure between the dynamic and internal pressures residing within the torque convertor as applied directly to the chamber 70 by conduit 8e or indirectly thereto from the main adjusting valve 35, while the pressure present within chamber 70a is determined by the position of the accelerator pedal.

As an example of the operation of the speed controlling means 14' depicted in FIG. 10, if it is considered that the transmission is mounted in a vehicle which is moving up a substantial incline, it will be seen that although the accelerator is normally substantially depressed under these conditions, whereby the pressure within chamber 70a will be increased due to the action of cam 74c on piston 74; the dynamic pressure within the torque convertor will increase to a much greater extent because of the rotational speed of the bladed turbine wheel 7. Thus, in this case, as the dynamic pressure present within the torque convertor as transmitted to the chamber 70 along with the internal pressure thereof via conduit 8e is much greater than the pressure present in chamber 70a, the automatic switching shaft 70 will be displaced to its left most position whereby the downshift point is detected and transmission is placed in its second forward speed gear ratio. However, as soon as the car approaches a normal or desired speed, the rotational speed of the engine and the bladed turbine wheel 7 become similar and therefore the dynamic pressure component transmitted to chamber 70 is substantially decreased. Under such conditions, although the accelerator pedal may be somewhat released wherein the pressure within the chamber 70a is somewhat decreased, the pressure within chamber 70a will substantially exceed the pressure present within chamber 70 whereby the automatic shifting shaft 71 will be displaced to the right causing the upshift of the transmission from its second forward gear speed ratio to its third forward speed gear ratio. Thus it is seen that the speed control means 14' as shown in FIG. 10 provides automatic detection of the downshift and the upshift points for the transmission apparatus according to the present invention as well as the automatic speed changing of the gear ratios present therein.

Each of the embodiments of the transmission apparatus according to the present invention as disclosed heretofore have utilized one or more sensing means present within the torque convertor section of the transmission apparatus to detect the flow speed of the circulating volume within the torque convertor. However, as there are a plurality of ways to sense said flow speed other than by the direct insertion of sensing means within the torque convertor, such direct sensing means need not of necessity be utilized in the transmission apparatus presented herein in accordance with the instant invention. Accordingly the embodiment of the invention disclosed in conjunction with FIG. 11 shows one such mode of sensing the flow speed of the circulating volume within the torque convertor section of the transmission without the introduction of direct sensing means therein. In the embodiment of the invention shown in FIG. 11, the reaction of the circulating volume with the stator 12 present in the torque convertor is utilized to detect the flow speed of the circulating volume. Again, as the embodiment of this invention illustrated in FIG. 11 has a substantial amount of structure in common with the embodiment of the invention shown and previously described in conjunction with FIGS. 1 and 3, the structure which is common has retained previously utilized reference numerals.

In the FIG. 11 embodiment, the stator portion 12 has been illustrated in the left portion of the figure in conjunction with the remaining portions of the torque convertor, in addition a detailed view of the stator 12 together with pertinent structure operatively connected thereto has been broken away and illustrated in the top portion of FIG. 11 so that its cooperation with the main adjusting valve 35' may be shown. As the broken away view of the stator 12 depicted in the top portion of FIG. 11 constitutes a more detailed showing of the pertinent structural relationships, it is suggested that reference to this view of the stator 12 be made in conjunction with the description thereof presented below.

As was the case in all the previously described embodiments of this invention, the stator portion 12 of the torque convertor section of the transmission according to the present invention is mounted on a one way clutch 12a which enables the stator 12 to rotate only in a single direction, and stator portion 12 and the one way clutch 12a are mounted on a shaft 12b which shaft is extended axially to the external case 1. However, in accordance with this embodiment, the shaft 12b is extended through the external case 1 and said shaft portion 12b is provided with a radially extending arm 12c mounted thereon. The radially extending arm 12c is connected to the external case 1 by a main spring 12d provided therefor. In the operation of the embodiment, which is explained below, the amount of expansion of the main spring 12d is used to sense the reaction of the circulating fluid with the stator portion 12 so that the flow speed of said circulating volume may be detected.

The radially extending arm 12c is connected by connecting rod 12e to the main adjusting valve 35' in a manner to apply force to the subspring 35'f provided therein. The main adjusting valve 35' as shown in FIG. 11, like its counterpart 35 as shown in FIG. 3, comprises an input oil connection to chamber 35'd from the oil pump 6 via conduit 41, a connection between the chamber 35'd and the oil reservoir 50 via conduits 34', 34a and 34d, an output connection from the chamber 35'c to the speed control means 14 (not shown herein but which may be similar to that shown in FIG. 4) via conduit 41b, and a second output connection from the chamber 35'd to the constant pressure adjusting valve 40b via conduit 41a. In addition, an input connection is made to chamber 35'b via oil conduit 41d which is branched from the conduit 41a.

In operation, the reaction of circulating fluid on the stator portion 12 within the torque convertor will be sensed by the radially extending arm 12c and the moment generated by such reaction will tend to move said radially extending arm 12c in the clockwise direction whereby the main spring 12d will tend to expand and thereby generate an equal but oppositely directed force from that produced by the moment of the reaction on the radially extending arm 12c. This force will be transmitted by connecting rod 12e to the subspring 35f provided within the main adjusting valve 35'. As the subspring 35'f is mounted within the main adjusting valve 35' in a compressed state so that it will always apply a downwardly directed force to the piston 35'a, the total force applied to the piston 35'a may be considered as that due to the sum of the component forces generated by the expansion of main spring 12d and the compression of subspring 35'f. Therefore, as should be apparent from the previous explanation of the main adjusting valve 35 given with regard to FIG. 3, when the pressure of the oil present in chamber 35'd of the main adjusting valve 35', as provided by the pump 6 connected thereto, is insufficient to generate a sufficient force on the small end portion of piston 35'a in fluid communication therewith to offset the downward force on the piston as generated by the expansion of main spring 12d plus the compression of the subspring 35'f minus the upward force generated by the oil pressure in chamber 35'e due to input conduit 41d; the piston 35'a will be driven in a downward direction to thereby tend to foreclose the path 34' which connects to the oil reservoir 50 thus increasing the pressure of the fluid within chamber 35'd. However, when the pressure present in chamber 35'd plus the pressure present in chamber 35'e generates an upward force on the piston 35'a which exceeds the downward force provided thereto by the expansion of main spring 12d and the compression of subspring 35'c; the piston 35'a will displace in the upward direction such that pressurized oil will be expelled from the chamber 35'd via the return oil conduit 34' to thereby reduce the pressure of the oil within chamber 35'd. Accordingly in each case it will be seen that the pressure in the chamber 35'd will be compensated by the main adjusting valve 35' such that the pressure therein is sufficient in combination with the pressure in chamber 35'e to generate an upward force on the piston 35'a which is equal and opposite to the downward force applied thereto by the expansion of main spring 12d and the compression of subspring 35'f. Thus the pressure present within chamber 35'd will accurately reflect the magnitude of the reaction of the circulating volume within the torque convertor on the stator 12.

The pressurized oil within chamber 35'd of the main adjusting valve 35' is then sent via conduit 41a to the constant pressure valve means 40 which applies the oil as modified therein to the torque convertor in the manner previously described with regard to FIG. 3 and in addition thereto appiles such modified oil via branching conduit 42a directly to the governor valve 32. Furthermore, the oil present within chamber 35'd is sent via 41b in the manner previously described with regard to FIGS. 3 and 4 to the speed control means 14 or 14' as previously mentioned above. However, in the case of this embodiment a branching conduit 41c is provided on conduit 41b so that the oil, appropriately adjusted by main adjusting valve 35' to reflect the flow speed within the torque convertor, is applied to conduit 8e and thereafter to chamber 70 of the automatic switching shaft 71 so that automatic speed change in the D position can be obtained.

Thus it is seen, that the embodiment of the transmission apparatus of this invention as shown in FIG. 11 provides means for sensing the flow speed of the circulating volume within the torque convertor without the introduction of direct sensing means within the torque converter. Further, it will be seen that the embodiment of FIG. 11 allows the flow speed as sensed therein to be utilized to appropriately adjust the oil pressure of the transmission apparatus according to this invention as well as to allow such pressure to control the detection of the various upshift and downshift points in the automatic speed shifting mode of operation of the transmission.

Although this invention has been disclosed in conjunction with various embodiments contemplating transmission apparatus having three forward stages and a single reverse stage to simplify the explanation thereof, it will be apparent that the principles of this invention are fully applicable to any known form of multistage transmission apparatus in use today, so that the various speed changes carried out by such transmissions may be accomplished smoothly and without shock while the durability of such transmissions can be extended. Furthermore, because the structure of this invention is relatively simple when compared to transmission apparatus typically disclosed in the prior art and highly advantageous when the maintenance thereof is considered; it will be realized that this invention will find widely varied fields of application in conjunction with vehicle of all types and in conveyer devices.

In addition, it should be noted that although this invention has been disclosed wherein the automatic switching shaft 71 is generally displaced to the right to thereby accomplish an upshift by sensing the wheel speed of the vehicle or the amount of the depression of the accelerator thereof; various other means of obtaining appropriate pressurizing sources for chamber 70a are available. Accordingly, the embodiment of the speed control means shown in FIGS. 4 and 10 could be modified so that the speed of the engine as applied to shaft 2 is sensed directly by a governor valve mounted thereon and the pressure derived therefrom could be appropriately applied to the chamber 70a located at the left portion of the automatic switching shaft 71. Thus, this convenient means of applying pressure to chamber 70a could be used, as well as many others, as a convenient alternative to those disclosed in FIGS. 4 and 10.

Furthermore, it should be noted that although the presure receiving means disclosed herein have in each case been mounted on either the bladed turbine wheel or the pump wheel at the front portions thereof, such mounting is not necesary to provide adequate detection of the dynamic and internal pressures present within the torque convertor. Accordingly it will be seen that such pressure receiving means can be located at any position on any of the three elements within the torque convertor and adequate sensing will result.

Finally, although only pitot tube means have been specifically mentioned in conjunction with the illustrated embodiments, when direct pressure receiving means have been placed within the torque convertor per se, it should be noted that any appropriate sensory means could be substituted therefor without varying the teachings of this invention. For example, it would be obvious to those of ordinary skill in the art to substitute venturi tube systems or a resistance plate whereby the flow speed within the torque convertor may be mechanically or electrically sensed by the change in condition caused thereby for the flow speed sensing means disclosed herein. Furthermore, the flow speed could also be detected wherein the bending moment applied to the blades of the bladed wheels provided in the torque convertor is sensed by electric strain gauge apparatus whereby the flow speed within the torque convertor could then be electrically indicated.

While the invention has been described in connection with a plurality of specific embodiments thereof, it will be understood that many modifications will be readily apparent to those of ordinary skill in the art; and that this invention is intended to cover any adaptations or variations thereof. Therefore, it is manifestly intended that this invention be only limited by the claims and the equivalents thereof.

What is claimed is:

1. In transmission apparatus of the fluid variety including torque convertor means having driven fluid present therein and having at least pump and turbine means mounted for rotation therein, said pump and turbine means including a pump wheel, a turbine wheel and a stator therebetween, a plurality of speed change gear means selectively driven by said torque convertor means, and means for selectively engaging said plurality of speed change gear means with said torque convertor means, said means for selectively engaging said plurality of speed change gear means including a plurality of fluid actuated clutch means and fluid actuated brake means, the improvement comprising:

sensor means positioned between the blades of said turbine wheel and present within said torque convertor means for detecting the flow speed of said driven fluid; and means responsive to said sensor means for supplying fluid having a pressure representative of the detected flow speed to said transmission apparatus.

2. The apparatus according to claim 1 wherein the improvement additionally comprises means for selectively applying a pressurized system fluid to said plurality of fluid actuated clutch means and fluid actuated brake means, said means for selectively applying said pressurized system fluid including pressure adjusting means which acts in response to said fluid having a pressure representative of said detected flow speed to adjust the pressure of system fluid supplied thereto to be proportional to said flow speed and means to selectively apply pressure adjusted system fluid from said pressure adjusting means to said plurality of fluid actuated clutch means and fluid actuated brake means.

3. The apparatus according to claim 2 wherein said pressure adjusting means comprises piston means having inputs in fluid communication with said means responsive to said sensor means and a source of system fluid and an output in fluid communication with said means to selectively apply pressure adjusted system fluid to said plurality of fluid actuated clutch means and fluid actuated brake means.

4. In transmission apparatus of the fluid variety including torque convertor means having a driven fluid present therein and having at least pump and turbine means mounted for rotation therein, a plurality of speed change gear means selectively driven by said torque convertor means, and means for selectively engaging said plurality of speed change gear means with said torque convertor means, said means for selectively engaging said plurality of speed change gear means including a plurality of fluid actuated clutch means and fluid actuated brake means, the improvement comprising:

sensor means mounted on said turbine means and present within said torque convertor means for detecting the flow speed of said driven fluid;

means responsive to said sensor means for supplying fluid having a pressure representative of the detected flow speed to said transmission apparatus;

means for selectively applying a pressurized system fluid to said plurality of fluid actuated clutch means and fluid actuated brake means, said means for selectively applying said pressurized system fluid including pressure adjusting means which acts in response to said fluid having a pressure representative of said detected flow speed to adjust the pressure of system fluid supplied thereto to be proportional to said flow speed and means to selectively apply pressure adjusted system fluid from said pressure adjusting means to said plurality of fluid actuated clutch means and fluid actuated brake means, said pressure adjusting means comprising piston means having inputs in fluid communication with said means responsive to said sensor means and a source of system fluid and an output in fluid communication with said means to selectively apply pressure adjusted system fluid to said plurality of fluid actuated clutch means and fluid actuated brake means; and means in fluid communication with said means to selectively apply pressure adjusted system fluid and with one of said fluid actuated clutch means to selectively apply pressurized system fluid to said one clutch means substantially as is when another of said clutch means is disengaged and acting to modify the pressure of said selectively applied pressurized system fluid applied to said one clutch means in proportion with the ratio of transmission torque when said another of said clutch means is engaged.

5. The apparatus according to claim 4 wherein said sensor means mounted on said turbine means acts to detect the flow speed of said driven fluid when said pump means is driving said turbine means.

6. The apparatus according to claim 5 wherein said means to selectively apply pressure adjusted system fluid from said pressure adjusting means to said plurality of fluid actuated clutch means and fluid actuated brake means comprises:

a plurality of system fluid paths, each of said plurality of system fluid paths being in fluid communication with at least one of said plurality of fluid actuated clutch means and fluid actuated brake means;

means for selectively connecting each of said plurality of system fluid paths to a source of adjusted system fluid and alternatively to a reservoir for system fluid; and shift point detection means for placing at least one of said plurality of system fluid paths in fluid communication with an additional one of said plurality of fluid actuated clutch means and fluid actuated brake means.

7. The apparatus according to claim 6 wherein said shift point detection means is operative to selectively place said at least one of said plurality of system fluid paths in fluid communication with an additional one of said plurality of fluid actuated clutch means and fluid actuated brake means when said means for selectively connecting is in a preselected condition.

8. The apparatus according to claim 7 wherein said shift point detection means comprises automatic fluid path switching means for placing said at least one of said plurality of system fluid paths in fluid communication with an additional one of said plurality of fluid actuated clutch means and fluid actuated brake means, said automatic fluid path switching means enabling fluid communication between said at least one of said plurality of system fluid paths and a fluid actuated brake means when in a first state and enabling fluid communication between said at least one of said plurality of system fluid paths and a fluid actuated clutch means when in a second state.

9. The apparatus according to claim 8 wherein said automatic fluid path switching means receives at one input thereto fluid having a pressure representative of the detected flow speed, said automatic fluid path switching means acting to differentially compare pressure received at said one input with another pressure and assume said first state when said pressure received at said one input exceeds said another pressure while assuming said second state when said pressure received at said one input is less than said another pressure, said shift point detection means thereby being operative, when said transmission is in a selected condition, to engage one of said fluid actuated brake means when said fluid having a pressure representative of the detected flow speed exceeds a selected value and to disengage said one fluid actuated brake means and engage one of said fluid actuated clutch means when said fluid having a pressure representative of the detected flow speed drops below said selected value.

10. The apparatus according to claim 9 wherein said another pressure and said selected value are variable quantities representative of the speed of motor means driving said transmission apparatus.

11. The apparatus according to claim 10 wherein said variable quantities representative of the speed of said motor means are determined by the setting of accelerator means connected to said motor means and applied as a second pressure input to said automatic fluid path switching means.

12. The apparatus according to claim 11 additionally comprising:

sensor means mounted on said pump means and present within said torque convertor means for detecting the flow speed of said driven fluid when said turbine means is driving said pump means; and switch means responsive to said sensor means mounted on both said turbine and pump means for supplying fluid having a pressure representative of the difference in flow speeds detected by each of said sensor means to said means responsive to said sensor means for supplying fluid having a pressure representative of the detected flow speed.

13. The apparatus according to claim 10 wherein said variable quantities representative of the speed of said motor means are determined by the rotation of shaft means driven by said motor means.

14. The apparatus according to claim 13 additionally comprising:

sensor means mounted on said pump means and present within said torque convertor means for detecting the flow speed of said driven fluid when said turbine means is driving said pump means; and switch means responsive to said sensor means mounted on both said turbine and pump means for supplying fluid having a pressure representative of the difference in flow speeds detected by each of said sensor means to said means responsive to said sensor means for supplying fluid having a pressure representative of the detected flow speed.

15. The apparatus according to claim 1 wherein the improvement additionally comprises means for selectively applying said fluid having a pressure representative of the detected flow speed in the form of a pressurized system fluid to said plurality of fluid actuated clutch means and fluid actuated brake means.

16. The apparatus according to claim 15 wherein the improvement additionally comprises means in fluid communication with said means for selectively applying said fluid and with one of said fluid actuated clutch means to selectively apply pressurized system fluid to said one clutch means substantially as is when another of said clutch means is disengaged and acting to modify the pressure of said selectively applied pressurized system fluid as applied to said one clutch means in proportion wth the ratio of transmission torque when said another of said clutch means is engaged.

17. The apparatus according to claim 16 wherein said means for selectively applying said system fluid to said plurality of fluid actuated clutch means and fluid actuated brake means comprises:
  a plurality of system fluid paths, each of said plurality of system fluid paths being in fluid communication with at least one of said plurality of fluid actuated clutch means and fluid actuated brake means;
  means for selectively connecting each of said plurality of system fluid paths to a source of system fluid and alternatively to a reservoir for system fluid; and
  shift point detection means for placing at least one of said plurality of system fluid paths in fluid communication with an additional one of said plurality of fluid actuated clutch means and fluid actuated brake means.

18. The apparatus according to claim 17 wherein said shift point detection means is operative to selectively place said at least one of said plurality of system fluid paths in fluid communication with an additional one of said plurality of fluid actuated clutch means and fluid actuated brake means when said means for selectively connecting is in a preselected condition.

19. The apparatus according to claim 18 wherein said shift point detection means comprises automatic fluid path switching means for placing said at least one of said plurality of system fluid paths in fluid communication with an additional one of said plurality of fluid actuated clutch means and fluid actuated brake means, said automatic fluid path switching means enabling fluid communication between said at least one of said plurality of system fluid paths and a fluid actuated brake means when in a first state and enabling fluid communication between said at least one of said plurality of system fluid paths and a fluid actuated clutch means when in a second state.

20. The apparatus according to claim 19 wherein said automatic fluid path switching means receives at one input thereto fluid having a pressure representative of the detected flow speed, said automatic fluid path switching means acting to differentially compare pressure received at said one input with another pressure and assume said first state when said pressure received at said one input exceeds said another pressure while assuming said second state when said pressure received at said one input is less than said another pressure, said shift point detection means thereby being operative, when said transmission is in a selected condition, to engage one of said fluid actuated brake means when said fluid having pressure representative of the detected flow speed exceeds a selected value and to disengage said one fluid actuated brake means and engage one of said fluid actuated clutch means when said fluid having a pressure representative of the detected flow speed drops below said selected value.

21. The apparatus according to claim 20 wherein said another pressure and said selected value are variable quantities representative of the speed of motor means driving said transmission apparatus.

22. The apparatus according to claim 21 wherein said variable quantities representative of the speed of said motor means are determined by the setting of accelerator means connected to said motor means and applied as a second pressure input to said automatic fluid path switching means.

23. The apparatus according to claim 22 additionally comprising:
  sensor means mounted on said pump means and present within said torque convertor means for detecting the flow speed of said driven fluid when said turbine means is driving said pump means; and
  switch means responsive to said sensor means mounted on both said turbine and pump means for supplying fluid having a pressure representative of the difference in flow speeds detected by each of said sensor means to said means responsive to said sensor means for supplying fluid having a pressure representative of the detected flow speed.

24. The apparatus according to claim 21 wherein said variable quantities representative of the speed of said motor means are determined by the rotation of shaft means driven by said motor means.

25. The apparatus according to claim 24 additionally comprising:
  sensor means mounted on said pump means and present within said torque convertor means for detecting the flow speed of said driven fluid when said turbine means is driving said pump means; and
  switch means responsive to said sensor means mounted on both said turbine and pump means for supplying fluid having a pressure representative of the difference in flow speed detected by each of said sensor means to said means responsive to said sensor means for supplying fluid having a pressure representative of the detected flow speed.

26. The apparatus according to claim 15 wherein said means for selectively applying said system fluid to said plurality of fluid actuated clutch means and fluid actuated brake means comprises:
  a plurality of system fluid paths, each of eaid plurality of system fluid paths being in fluid communication with at least one of said plurality of fluid actuated clutch means and fluid actuated brake means;
  means for selectively connecting each of said plurality of system fluid paths to a source of system fluid and alternatively to a reservoir for system fluid; and
  shift point detection means for placing at least one of said plurality of system fluid paths in fluid communication with an additional one of said plurality of fluid actuated clutch means and fluid actuated brake means.

27. The apparatus according to claim 26 wherein said shift point detection means is operative to selectively place said at least one of said plurality of system fluid paths in fluid communication with an additional one of said plurality of fluid actuated clutch means and fluid actuated brake means when said means for selectively connecting is in a preselected condition.

28. The apparatus according to claim 27 wherein said shift point detection means comprises automatic fluid path switching means for placing said at least one of said plurality of system fluid paths in fluid communication with an additional one of said plurality of fluid actuated clutch means and fluid actuated brake means, said automatic fluid path switching means enabling fluid communication between said at least one of said plurality of system fluid paths and a fluid actuated brake means when in a first state and enabling fluid communication between said at least one of said plurality of system fluid paths and a fluid actuated clutch means when in a second state.

29. The apparatus according to claim 28 wherein said automatic fluid path switching means receives at one input thereto fluid having a pressure representative of the detected flow speed, said automatic fluid path switching means acting to differentially compare pressure received at said one input with another pressure and assume said first state when said pressure received at said one input exceeds said another pressure while assuming said second state when said pressure received at said one input is less than said another pressure, said shift point detection means thereby being operative, when said transmission is in a selected condition, to engage one of said fluid actuated brake means when said fluid having pressure representative of the detected flow speed exceeds a selected value and to disengage said one fluid actuated brake means and engage one of said fluid actuated clutch means when said fluid having a pressure representative of the detected flow speed drops below said selected value.

30. In transmission apparatus of the fluid variety including torque convertor means having a driven fluid present therein and having at least pump and turbine means mounted for rotation therein, a plurality of speed change gear means selectively driven by said torque convertor means, and means for selectively engaging said plurality of speed change gear means with said torque convertor means, said means for selectively engaging said plurality of speed change gear means including a plurality of fluid actuated clutch means and fluid actuated brake means; the improvement comprising:
  sensor means mounted on said turbine means and present within said torque convertor means for detecting the flow speed of said driven fluid;
  means responsive to said sensor means for supplying fluid having a pressure representative of the detected flow speed to said transmission apparatus;
  sensor means mounted on said pump means and present within said torque convertor means for detecting the flow speed of said driven fluid when said turbine means is driving said pump means; and
  switch means responsive to said sensor means mounted on both said turbine and pump means for supplying fluid having a pressure representative of the difference in flow speeds detected by each of said sensor means to said means responsive to said sensor means for supplying fluid having a pressure representative of the detected flow speed.

31. The apparatus according to claim 30 wherein the improvement additionally comprises means for selectively applying said fluid having a pressure representative of the detected flow speed in the form of a pressurized system fluid to said plurality of fluid actuated clutch means and fluid actuated brake means.

32. The apparatus according to claim 31 wherein the improvement additionally comprises means in fluid communication with said means for selectively applying said fluid and with one of said fluid actuated clutch means to selectively apply pressurized system fluid to said one clutch means substantially as is when another of said clutch means is disengaged and acting to modify the pressure of said selectively applied pressurized system fluid as applied to said one clutch means in proportion with the ratio of transmission torque when said another of said clutch means is engaged.

33. The apparatus according to claim 32 wherein said means for selectively applying said system fluid to said plurality of fluid actuated clutch means and fluid actuated brake means comprises:
  a plurality of system fluid paths, each of said plurality of system fluid paths being in fluid communication with at least one of said plurality of fluid actuated clutch means and fluid actuated brake means;
  means for selectively connecting each of said plurality of system fluid paths to a source of system fluid and alternatively to a reservoir for system fluid; and
  shift point detection means for placing at least one of said plurality of system fluid paths in fluid communication with an additional one of said plurality of fluid actuated clutch means and fluid actuated brake means.

34. The apparatus according to claim 33 wherein said shift point detection means is operative to selectively place said at least one of said plurality of system fluid paths in fluid communication with an additional one of said plurality of fluid actuated clutch means and fluid actuated brake means when said means for selectively connecting is in a preselected condition.

35. The apparatus according to claim 34 wherein said shift point detection means comprises automatic fluid path switching means for placing said at least one of said plurality of system fluid paths in fluid communication with an additional one of said plurality of fluid actuated clutch means and fluid actuated brake means, said automatic fluid path switching means enabling fluid communication between said at least one of said plurality of system fluid paths and a fluid actuated brake means when in a first state and enabling fluid communication between said at least one of said plurality of system fluid paths and a fluid actuated clutch means when in a second state.

36. The apparatus according to claim 35 wherein said automatic fluid path switching means receives at one input thereto fluid having a pressure representative of the detected flow speed, said automatic fluid path switching means acting to differentially compare pressure received at said one input with another pressure and assume said first state when said pressure received at said one input exceeds said another pressure while assuming said second state when said pressure received at said one input is less than said another pressure, said shift point detection means thereby being operative, when said transmission is in a selected condition, to engage one of said fluid actuated brake means when said fluid having pressure representative of the detected flow speed exceeds a selected value and to disengage said one fluid actuated brake means and engage one of said fluid actuated clutch means when said fluid having a pressure representative of the detected flow speed drops below said selected value.

37. The apparatus according to claim 36 wherein said another pressure and said selected value are variable quantities representative of the speed of motor means driving said transmission apparatus.

38. The apparatus according to claim 37 wherein said variable quantities representative of the speed of said motor means are determined by the setting of accelerator means connected to said motor means and applied as a second pressure input to said automatic fluid path switching means.

39. The apparatus according to claim 37 wherein said variable quantities representative of the speed of said motor means are determined by the rotation of shaft means driven by said motor means.

40. In transmission apparatus of the fluid variety including torque converter means having a driven fluid present therein and have at least pump, turbine and stator means mounted for rotation therein, a plurality of speed change gear means selectively driven by said torque convertor means, and means for selectively engaging said plurality of speed change gear means with said torque convertor means, said means for selectively engaging said plurality of speed change gear means including a plurality of fluid actuated clutch means and fluid actuated brake means; the improvement comprising:
  means for sensing the flow speed of said driven fluid within said torque convertor means;
  pressure adjusting means responsive to said sensing means, said pressure adjusting means acting in response to said sensing means to adjust the pressure of system fluid supplied thereto to be proportional to said flow speed;
  a plurality of system fluid paths, each of said plurality of system fluid paths being in fluid communication with at least one of said plurality of fluid actuated clutch means and fluid actuated brake means;
  means for selectively connecting each of said plurality of system fluid paths to a source of adjusted system fluid at an output of said pressure adjusting means and alternatively to a reservoir for system fluid;

automatic shift point detection means for placing at least one of said plurality of system fluid paths in fluid communication with an additional one of said plurality of fluid actuated clutch means and fluid actuated brake means, when said transmission is in a selected condition, said automatic shaft point detection means exhibiting first and second states and enabling fluid communication between said at least one of said plurality of system fluid paths and a fluid actuated brake means when in a first state and enabling fluid communication between said at least one of said plurality of system fluid paths and a fluid actuated brake means when in a second state; and means for applying adjusted system fluid from said pressure adjusting means to a switching input of said automatic shift point detection means, said automatic shift point detection means acting to differentially compare pressure received at said switching input with another pressure and assuming said first state when said pressure received at said switching input exceeds said another pressure while assuming said second state when said pressure received at said switching input is less than said another pressure, said automatic shift point detection means is thereby being operative, when said transmission is in a selected condition, to engage an additional one of said fluid actuated brake means with said at least one of said plurality of system paths when said fluid having a pressure representative of the detected flow speed exceeds a selected value and to disengage said one fluid actuated brake means and engage an additional one of said fluid actuated clutch means when said fluid having a pressure representative of the detected flow speed drops below said selected value.

41. The apparatus according to claim 40 wherein said means for sensing the flow speed of said driven fluid within said torque convertor means comprises means for measuring reaction forces induced on said stator by said driven fluid.

References Cited

UNITED STATES PATENTS

| | | | |
|---|---|---|---|
| 3,004,447 | 10/1961 | Sand | 74—868 |
| 3,202,018 | 8/1965 | Hilpert | 74—732 |
| 3,433,096 | 3/1969 | Tuck et al. | 74—731 |
| 2,871,725 | 2/1959 | Teramala | 74—731 |
| 2,959,984 | 11/1960 | Wickman | 74—688 |
| 3,180,095 | 4/1965 | Schneider | 60—54 |
| 3,403,584 | 10/1968 | Ellis et al. | 74—757 |
| 3,416,393 | 12/1968 | Hattori | 74—731 |

ARTHUR T. McKEON, Primary Examiner

U.S. Cl. X.R.

74—731, 752

UNITED STATES PATENT OFFICE
CERTIFICATE OF CORRECTION

Patent No. 3,614,903         Dated October 26, 1971

Inventor(s) MASAAKI NOGUCHI, SHIGERU SAKAKIBARA, TOMOO ISHIHARA

It is certified that error appears in the above-identified patent and that said Letters Patent are hereby corrected as shown below:

Column 1, line 5, after "Japan" there should be inserted --and Aishin Seiki Kabushiki Kaisha, Aichi-ken, Japan--.

Signed and sealed this 8th day of August 1972.

(SEAL)
Attest:

EDWARD M. FLETCHER, JR.         ROBERT GOTTSCHALK
Attesting Officer               Commissioner of Patents